United States Patent [19]
Neal

[11] Patent Number: 6,130,419
[45] Date of Patent: Oct. 10, 2000

[54] FIXED MOUNT WAVEFRONT SENSOR

[75] Inventor: Daniel R. Neal, Tijeras, N. Mex.

[73] Assignee: Wavefront Sciences, Inc., Albuquerque, N. Mex.

[21] Appl. No.: 09/344,063

[22] Filed: Jun. 25, 1999

Related U.S. Application Data

[63] Continuation-in-part of application No. 09/111,620, Jul. 7, 1998, Pat. No. 5,936,720, which is a continuation-in-part of application No. 08/678,019, Jul. 10, 1996, Pat. No. 5,864,381.
[60] Provisional application No. 60/051,863, Jul. 7, 1997.

[51] Int. Cl.$^7$ .................................................. G01J 1/20

[52] U.S. Cl. ................................................ 250/201.9

[58] Field of Search ............................ 351/200, 205, 351/206, 212, 246, 247; 250/201.9, 208.1; 356/121, 353, 359, 349, 351, 354, 124; 359/559, 566, 619, 846, 847, 848, 849, 573; 430/321

[56] References Cited

U.S. PATENT DOCUMENTS

| | | |
|---|---|---|
| 3,829,219 | 8/1974 | Wyant ...................................... 356/353 |
| 4,030,831 | 6/1977 | Gowrinathan ........................... 356/359 |
| 4,141,652 | 2/1979 | Feinleib . |
| 4,399,356 | 8/1983 | Feinleib et al. . |
| 4,518,854 | 5/1985 | Hutchin . |
| 4,737,621 | 4/1988 | Gonsiorowski et al. ............... 250/201 |
| 4,895,790 | 1/1990 | Swanson et al. . |
| 4,950,878 | 8/1990 | Ulich et al. . |
| 5,004,673 | 4/1991 | Vlannes . |
| 5,078,771 | 1/1992 | Wu . |
| 5,113,064 | 5/1992 | Manhart . |
| 5,287,165 | 2/1994 | Ulich et al. . |
| 5,291,333 | 3/1994 | Mills et al. . |
| 5,493,391 | 2/1996 | Neal et al. . |
| 5,629,765 | 5/1997 | Schmutz . |
| 5,629,802 | 5/1997 | Clark . |

*Primary Examiner*—George Manuel
*Attorney, Agent, or Firm*—Jeffrey D. Meyers

[57] ABSTRACT

A rigid mount and method of mounting for a wavefront sensor. A wavefront dissector, such as a lenslet array, is rigidly mounted at a fixed distance relative to an imager, such as a CCD camera, without need for a relay imaging lens therebetween.

23 Claims, 18 Drawing Sheets

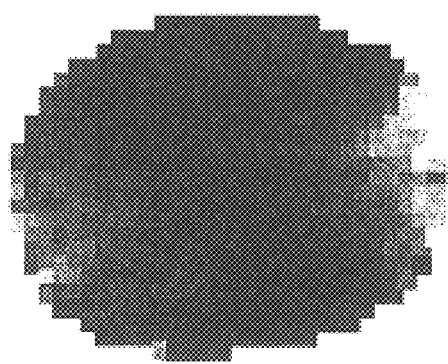 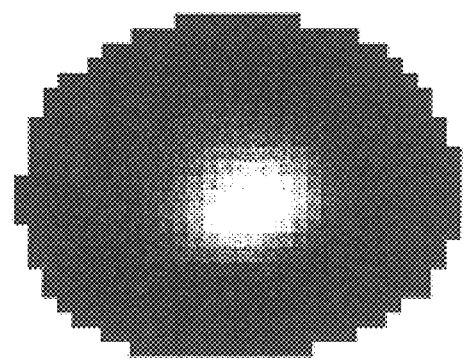
FIG-17a                    FIG-17b

| DESCRIPTION | | P-V WFE | RMS WFE | M2 | W | Z0 | W0 | 0 |
|---|---|---|---|---|---|---|---|---|
| WFSI He Ne w/ND No TILT | x | 0.3714 | 0.038 | 1.375 | 0.273 | 0.4453 | 0.242 | 0.275 |
|  | y |  |  | 1.533 | 0.292 | 0.4804 | 0.252 | 0.287 |
| WSFSI Ne Ne w/ND 1 mr TILT | x | 0.3682 | 0.039 | 1.443 | 0.274 | 0.458 | 0.237 | 0.338 |
|  | y |  |  | 1.552 | 0.408 | 0.472 | 0.253 | 0.33 |
| NIST He Ne 1 Z = 1650mm | x | 0.5193 | 0.082 | 1.1793 | 0.407 | 1.2575 | 0.217 | 0.2719 |
|  | y |  |  | 1.138 | 0.386 | 1.2718 | 0.2072 | 0.2723 |
| NIST He Ne 5 Z = 1650mm | x | 0.4294 | 0.073 | 1.118 | 0.385 | 1.2 | 0.2098 | 0.2727 |
|  | y |  |  | 1.118 | 0.644 | 1.1916 | 0.2051 | 0.2704 |
| NIST He Ne 7 Z = 2400mm | x | 0.8723 | 0.137 | 1.4001 | 0.642 | 2.143 | 0.2572 | 0.2734 |
|  | y |  |  | 1.216 | 0.637 | 2.208 | 0.2238 | 0.2708 |
| ACOUSTO-OPTIC MODULATOR He Ne | x | 0.1106 | 0.012 | 1.213 | 0.78 | 1.762 | 0.7672 | 0.0747 |
|  | y |  |  | 1.285 | 0 | -0.649 | 0.6337 | 0.0924 |

FIG-18

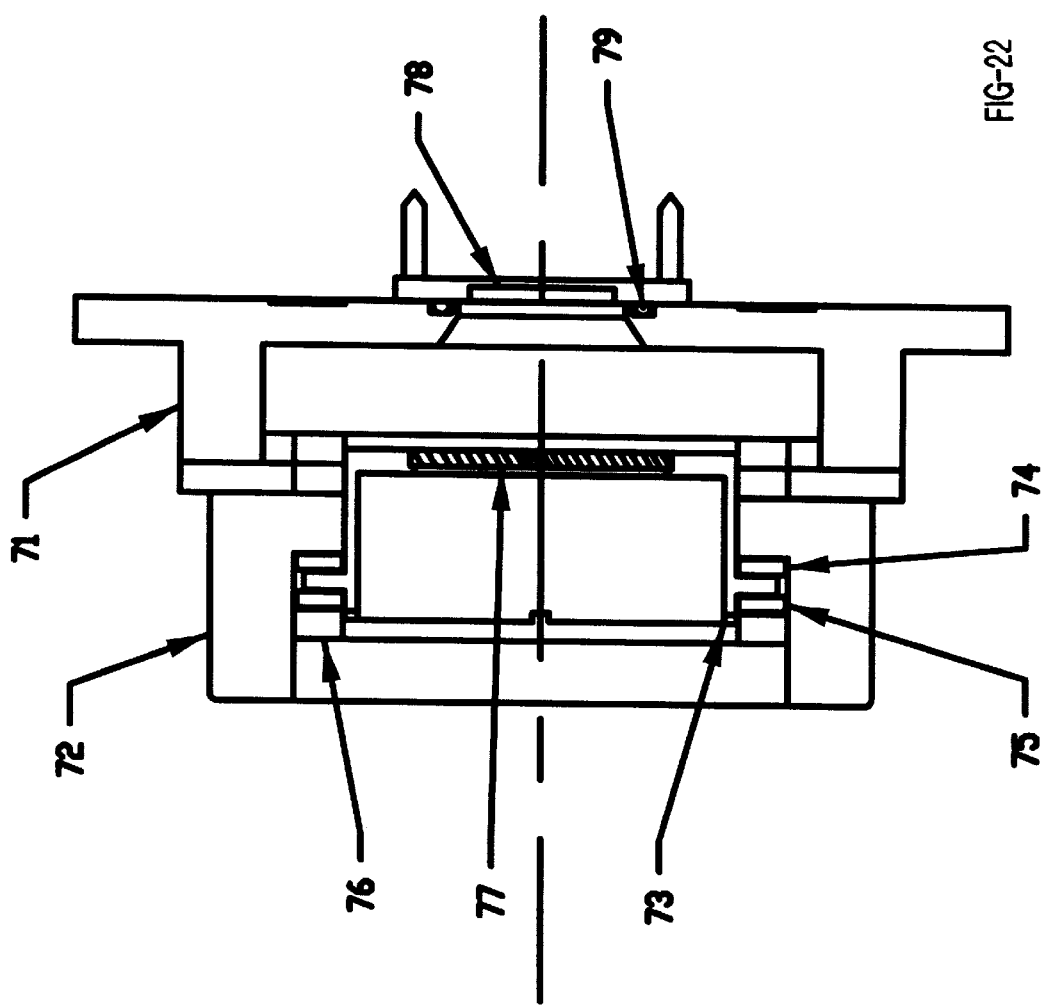

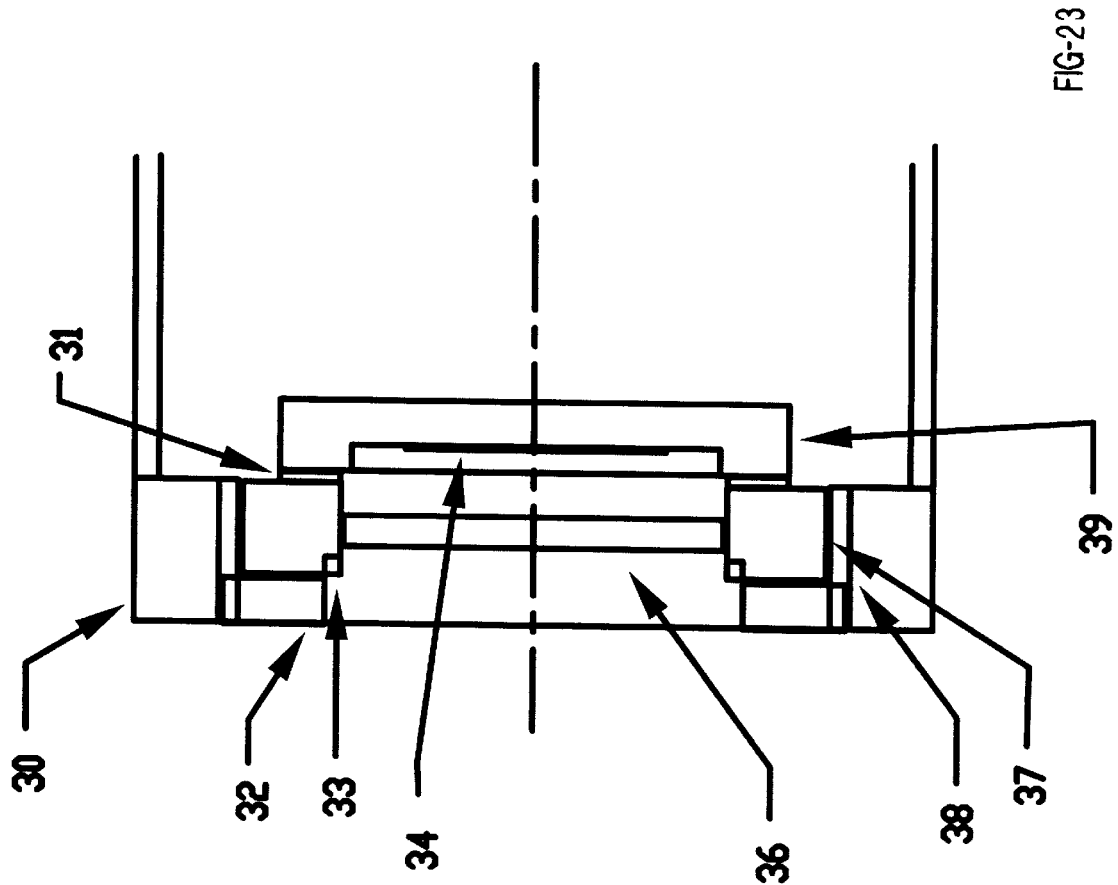

FIXED MOUNT WAVEFRONT SENSOR

CROSS-REFERENCE TO RELATED APPLICATIONS

This application is a continuation-in-part application of U.S. patent application Ser. No. 09/111,620, now U.S. Pat. No. 5,936,720 entitled "Beam Characterization by Wavefront Sensor", to Daniel R. Neal, filed on Jul. 7, 1998, which in turn was a continuation-in-part application of U.S. patent application Ser. No. 08/678,019, entitled "Automated Pupil Remapping With Binary Optics", to Daniel R. Neal, filed on Jul. 10, 1996, now U.S. Pat. No. 5,864,381, and which claimed the benefit of U.S. Provisional Patent Application Ser. No. 60/051,863, entitled "Beam Characterization by Wavefront Sensor", to Daniel R. Neal, et al., filed on Jul. 7, 1997, and the specifications thereof are incorporated herein by reference.

GOVERNMENT RIGHTS

The Government may have rights to this invention pursuant to Contract No. DE-AC04-94AL85000 awarded by the U.S. Department of Energy.

BACKGROUND OF THE INVENTION

1. Field of the Invention (Technical Field)

The present invention relates to methods and apparatuses for beam characterization and for construction of practical wavefront sensors for beam characterization, metrology, and other applications.

2. Background Art

In many instances where a laser beam is needed, it is important to know something about the laser beam quality. The beam quality affects how the beam will propagate, as well as how tightly it will focus. Unfortunately, beam quality is a somewhat elusive concept. Numerous attempts have been made to define beam quality, stretching back almost to the invention of the laser. In practice, any one of these measures will have some flaw in certain situations, and many different measures are often used. Among these is the $M^2$ parameter (space-beamwidth product).

The irradiance (or intensity) and phase distribution of a laser beam are sufficient for determining how the beam will propagate or how tightly it can be focused. Most of the beam quality measurements rely on characterizing the beam from only the irradiance distribution, since obtaining this is a comparably straightforward process. However, if both the irradiance and phase distribution could be obtained simultaneously, then all the information would be available from a single measurement.

In general, phase is measured with an interferometer. Interferometers are sensitive instruments that have been extensively developed. They can be used to measure laser beams by using a shearing or filtered Mach-Zehnder arrangement, and can produce the desired irradiance and phase distribution. Unfortunately, these systems rapidly become complex, and are slow, unwieldy, sensitive to alignment, as well as being expensive.

A Shack-Hartmann wavefront sensor is an alternative method for measuring both irradiance and phase. Such sensors have been developed by the military for defense adaptive optics programs over the last 25 years. This sensor is a simple device that is capable of measuring both irradiance and phase distributions in a single frame of data. The advent of micro-optics technology for making arrays of lenses has allowed these sensors to become much more sophisticated in recent years. In addition, advances in charge coupled device (CCD) cameras, computers and automated data acquisition equipment have brought the cost of the required components down considerably. With a Shack-Hartmann wavefront sensor it is relatively straightforward to determine the irradiance and phase of a beam. This allows not only the derivation of various beam quality parameters, but also the numerical propagation of the sampled beam to another location, where various parameters can then be measured.

$M^2$ has become a commonly used parameter to generally describe near-Gaussian laser beams. It is especially useful in that it allows a prediction of the real beam spot size and average irradiance at any successive plane using simple analytic expressions. This allows system designers the ability to know critical beam parameters at arbitrary planes in the optical system. Unfortunately, measuring $M^2$ is somewhat difficult. To date, obtaining $M^2$ has generally required measurements of propagation distributions at multiple locations along the beam path. Although efforts have been made to obtain this parameter in a single measurement, these still suffer from the need to make simultaneous measurements at more than one location. The present invention permits calculation of the parameter using only a single measurement at a single location.

The following references relate to development of the present invention: A. E. Siegman, "New developments in laser resonators", SPIE Vol.1224, Optical Resonators (1990), pp.2–14; H. Weber, "Some historical and technical aspects of beam quality", Opt.QuantElec. 24 (1992), S861–864; M. W. Sasnett, and T. F. Johnston, Jr., "Beam characterization and measurement of propagation attributes", SPIE Vol. 1414, Laser Beam Diagnostics (1991), pp. 21–32; D. Malacara, ed., *Optical Shop Testing*, John Wiley & Sons, Inc., 1982; D. Kwo, G. Damas, W. Zmek, "A Hartmann-Shack wavefront sensor using a binary optics lenslet array", SPIE Vol.1544, pp. 66–74 (1991); W. H. Southwell, "Wave-front estimation from wavefront slope measurements", *JOSA* 70 (8), pp.993–1006 (August, 1980); J. A. Ruff and A. E. Siegman, "Single-pulse laser beam quality measurements using a CCD camera system", Appl.Opt., Vol.31, No.24 (Aug. 20, 92) pp. 4907–4908; Gleb Vdovin, *LightPipes: beam propagation toolbox*, ver.1.1, Electronic Instrumentation Laboratory, Technische Universiteit Delft, Netherlands, 1996; *General Laser Analysis and Design* (GLAD) code, v. 4.3, Applied Optics Research, Tucson, Ariz., 1994; A. E. Siegman, "Defining the Effective Radius of Curvature for a nonideal Optical Beam", *IEEE J. Quant.Elec.*, Vol.27, No.5 (May 1991), pp.1146–1148; D. R. Neal, T. J. O'Hern, J. R. Torczynski, M. E. Warren and R. Shul, "Wavefront sensors for optical diagnostics in fluid mechanics: application to heated flow, turbulence and droplet evaporation", SPIE Vol. 2005, pp. 194–203 (1993); L. Schmutz, "Adaptive optics: a modern cure for Newton's tremors", Photonics Spectra (April 1993); D. R. Neal, J. D. Mansell, J. K Gruetzner, R. Morgan and M. E. Warren, "Specialized wavefront sensors for adaptive optics", SPIE Vol. 2534, pp. 338–348 (1995); MATLAB for Windows, v. 4.2c.1, The MathWorks, Inc., Natick, Mass., 1994; and J. Goodman, *Introduction to Fourier Optics*, McGraw-Hill, (New York, 1968).

The present invention is of a wavefront sensor that is capable of obtaining detailed irradiance and phase values from a single measurement. This sensor is based on a microlens array that is built using micro optics technology to provide fine sampling and good resolution. With the sensor, $M^2$ can be determined. Because the full beam irradiance and phase distribution is known, a complete beam irradiance and phase distribution can be predicted anywhere along the beam. Using this sensor, a laser can be completely characterized and aligned. The user can immediately tell if the beam is single or multimode and can predict the spot size, full irradiance, and phase distribution at any plane in the optical system. The sensor is straightforward to use, simple, robust, and low cost.

In addition to beam characterization, there are a wide variety of applications for wavefront sensors. These include metrology of surfaces, transmissive media, or other objects, measurement of turbulence or inhomogenous media, and static or dynamic measurement of surface or object deformation. These applications benefit in advances to basic sensor technology and can take advantage of many of the features, strengths, and objects of the methods and apparatuses described herein.

A key advantage of the technologies disclosed herein is their inherent stability and robustness. This results from the extremely compact, robust, and rigid sensors that can be constructed at low cost. This is a significant advantage for a host of applications, including beam characterization and those mentioned in the preceding paragraph. In some cases, a robust, compact sensor enables an application otherwise impossible. Furthermore, the techniques needed for constructing such sensors are not readily apparent, with many subtleties being involved in design aspects that would not be apparent even to those highly skilled in the art.

SUMMARY OF THE INVENTION
(DISCLOSURE OF THE INVENTION)

The present invention is of a method and apparatus for characterizing an energy beam (preferably a laser), comprising a two-dimensional wavefront sensor comprising a lenslet array and directing the beam through the sensor. In the preferred embodiment, the wavefront sensor is a Shack-Hartmann wavefront sensor. Wavefront slope and irradiance (preferably at a single location along the beam) are measured, wavefront slope distribution is integrated to produce wavefront or phase information, and a space-beamwidth product is calculated (preferably by, as later defined, the gradient method, the curvature removal method, or the Fourier propagation method). A detector array is employed, such as a charge coupled device (CCD) camera, a charge inductive device (CID) camera, or a CMOS camera, rigidly mounted behind the wavefront sensor, ideally at the focal point of the lenslet array. Shims are used to adjust spacing between the wavefront sensor and the detector array, following computation of shim size and placement to properly adjust the spacing. The sensor is calibrated, preferably against known optically induced wavefront curvature or tilt, and most preferably by generating a reference beam and computing one or more spot positions (using a computation such as the center-of-mass computation, matched filter computation, or correlation computation).

The invention is additionally of a method of fabricating micro optics comprising: generating a digital description of the micro optic; fabricating a photomask; lithographically projecting the photomask's pattern onto a layer of photoresist placed on a substrate; etching the photoresist layer and the substrate until all photoresist has been removed; and applying this method to fabricating lenslet arrays for Shack-Hartmann wavefront sensors.

The invention is also of a means for constructing practical wavefront sensors for a wide variety of applications. Techniques are disclosed for the design and construction of compact, rigid, and robust sensors. More specifically, the present invention is also of a mount for, and method of mounting, a wavefront dissector comprising rigidly mounting a wavefront dissector relative to an imager at a fixed distance without a relay imaging lens between the wavefront dissector and the imager. In the preferred embodiments, a region between the wavefront dissector and the imager is sealed, such as with an o-ring, epoxy, or glue. Mounting is preferably done employing one or more of the following: a mechanical mount connected directly to the imager; threads, preferably with a locking mechanism; shims; and/or integration of the wavefront dissector directly onto imager optics. The wavefront dissector is preferably a lenslet array.

The present invention is additionally of a wavefront sensor comprising a wavefront dissector, an imager, and a rigid mount such that the wavefront dissector is rigidly held relative to the imager at a fixed distance without a relay imaging lens between said wavefront dissector and said imager. Preferably, the region between the wavefront dissector and the imager is sealed.

A primary object of the present invention is provide a means for laser beam characterization using only a single measurement at a single location, which is also the primary advantage of the invention.

Another object of the present invention is to provide such a means that is compact, robust, and insensitive to vibration.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 8:
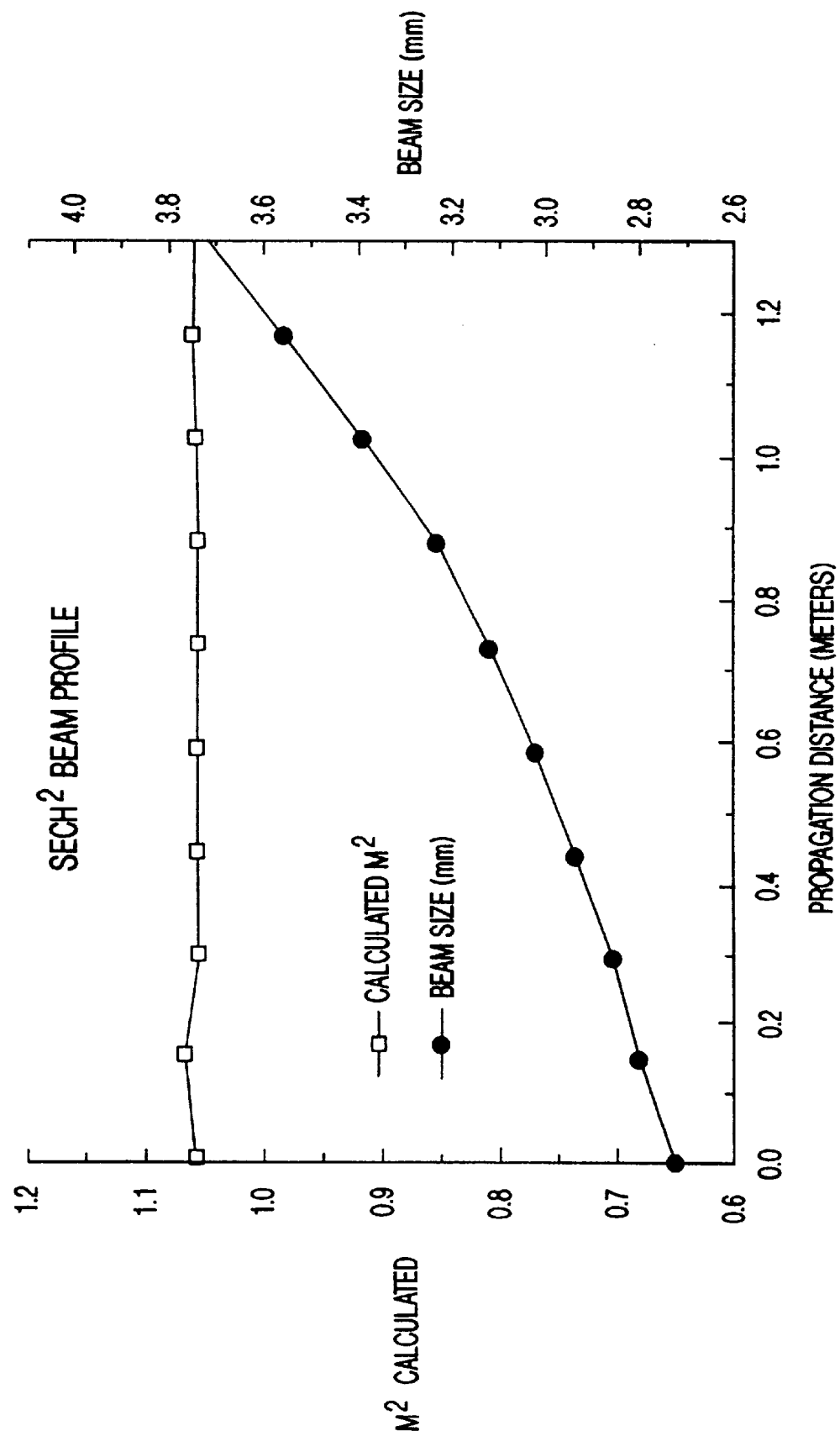
Figure 9:
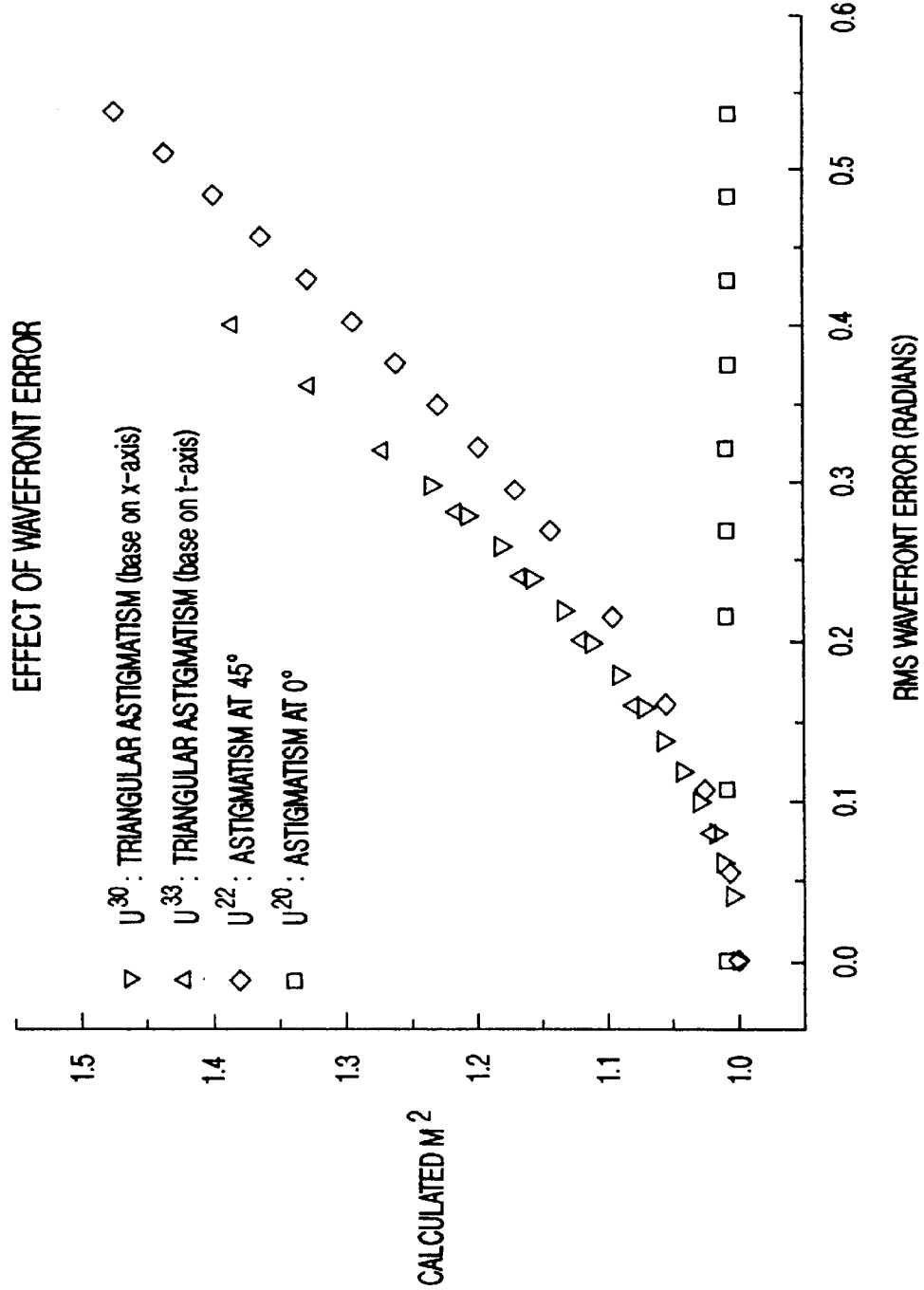
Figure 10:
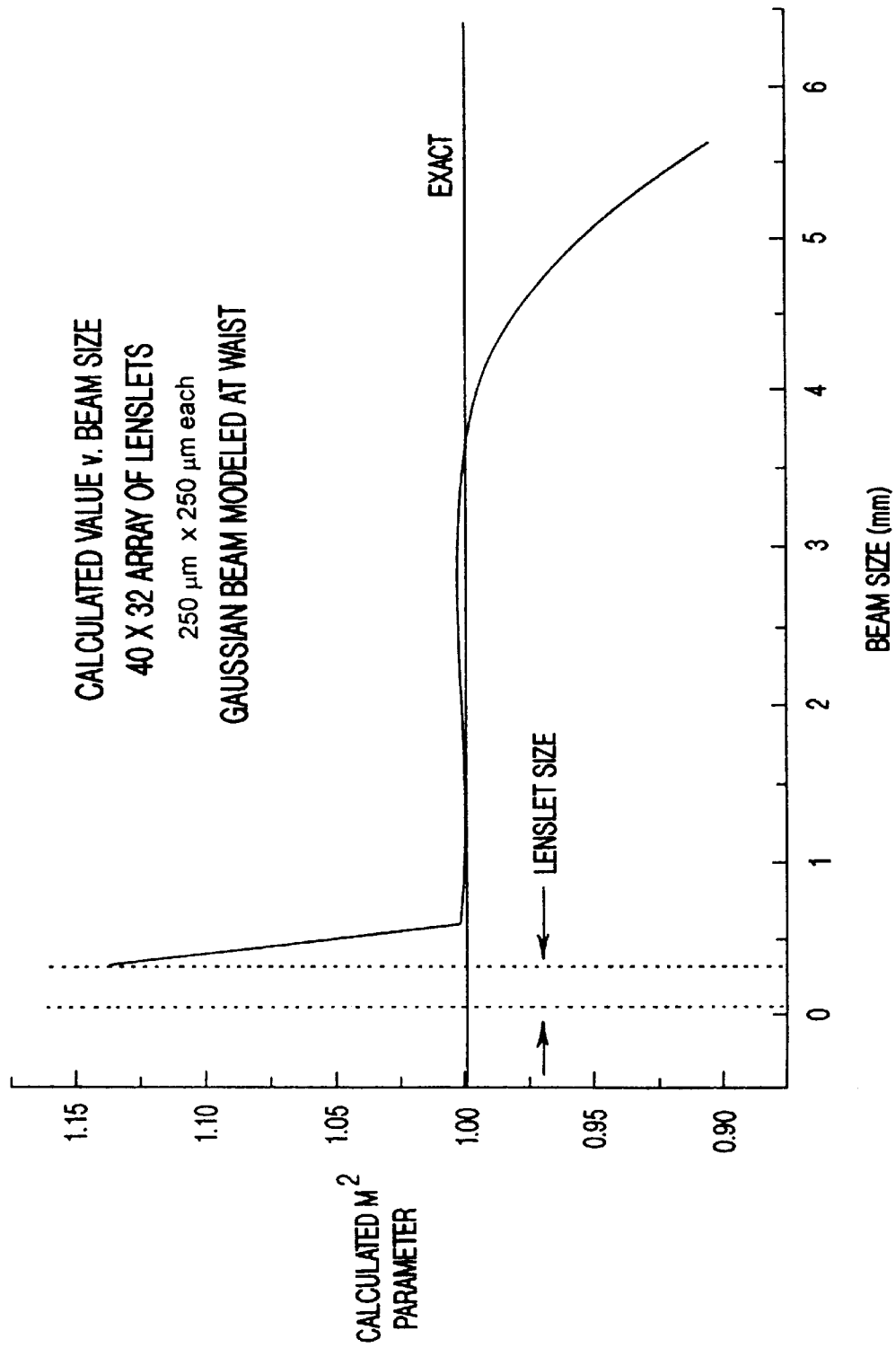
Figure 11:
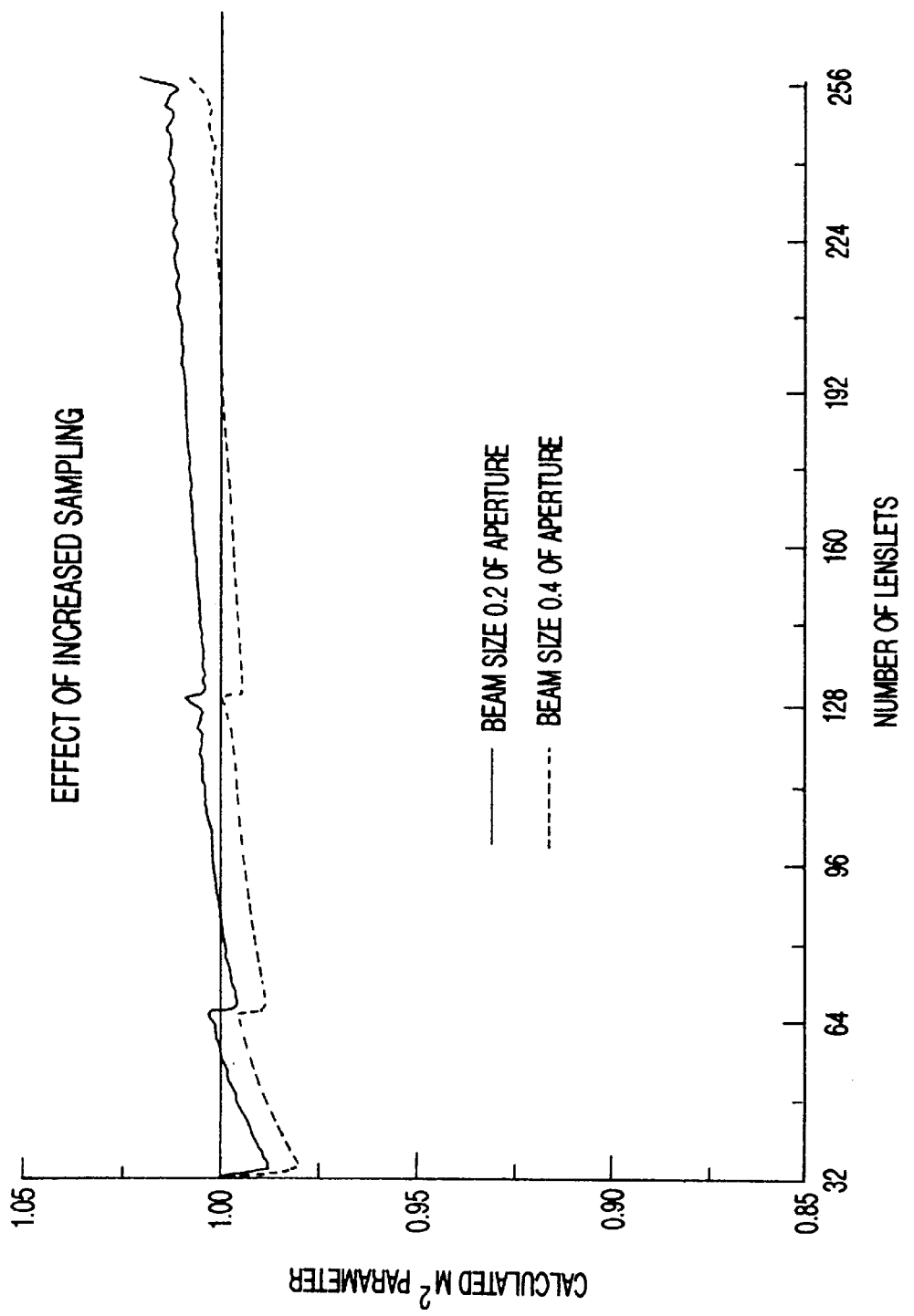
Figure 12:
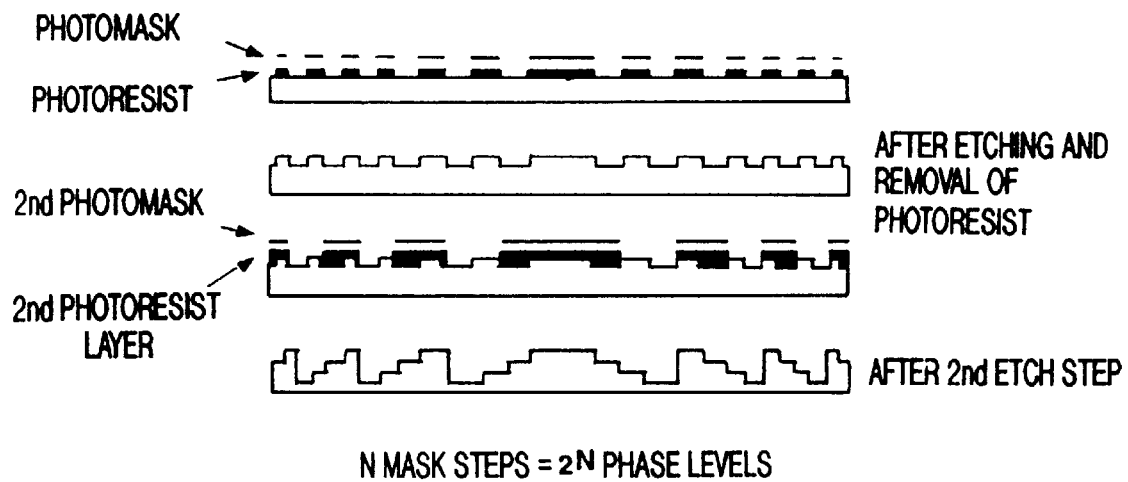
Figure 13:
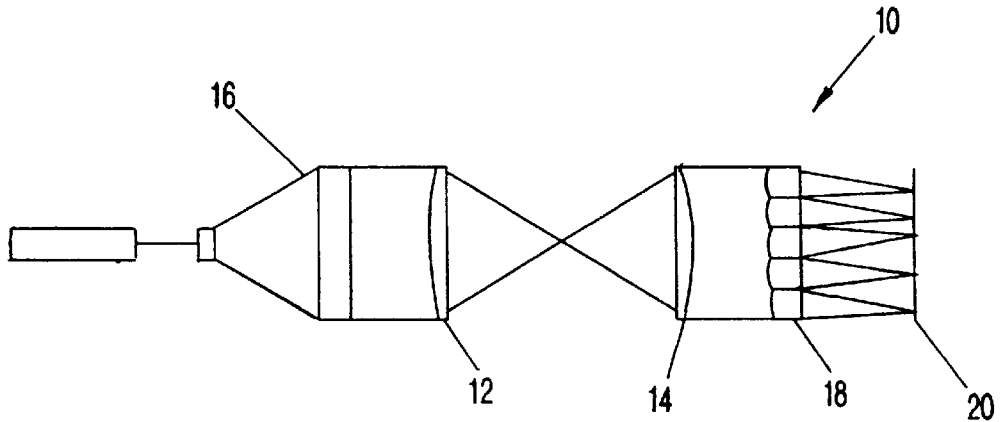
Figure 14:
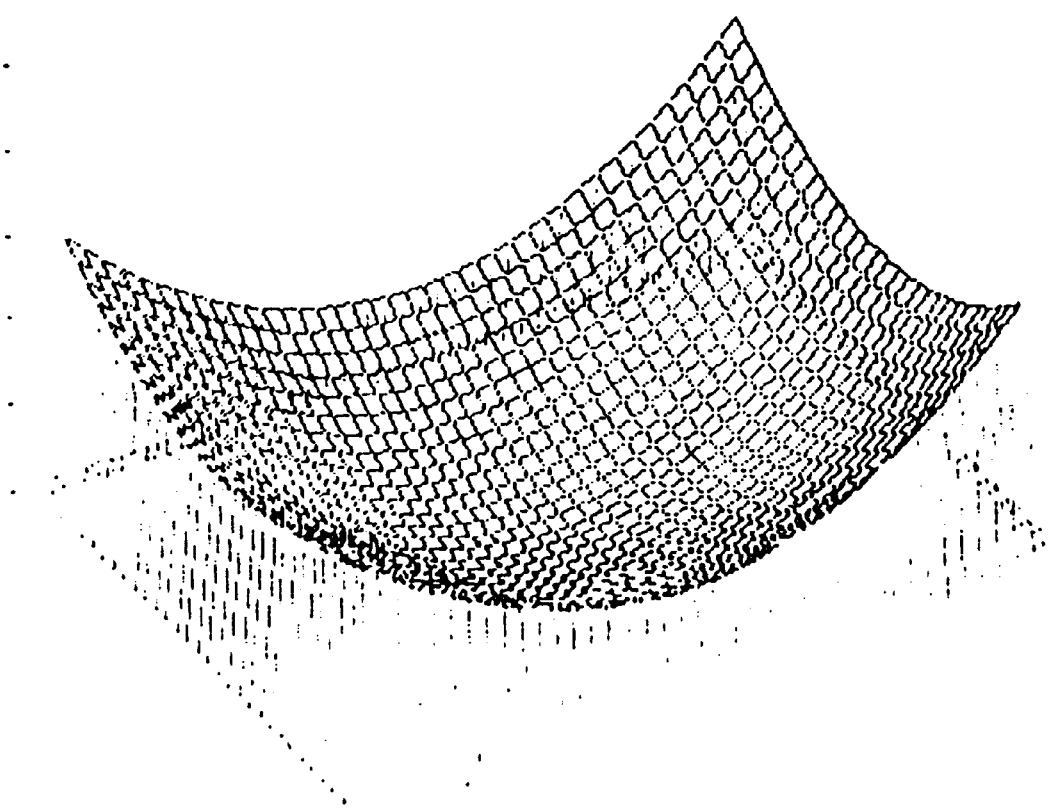
Figure 15:
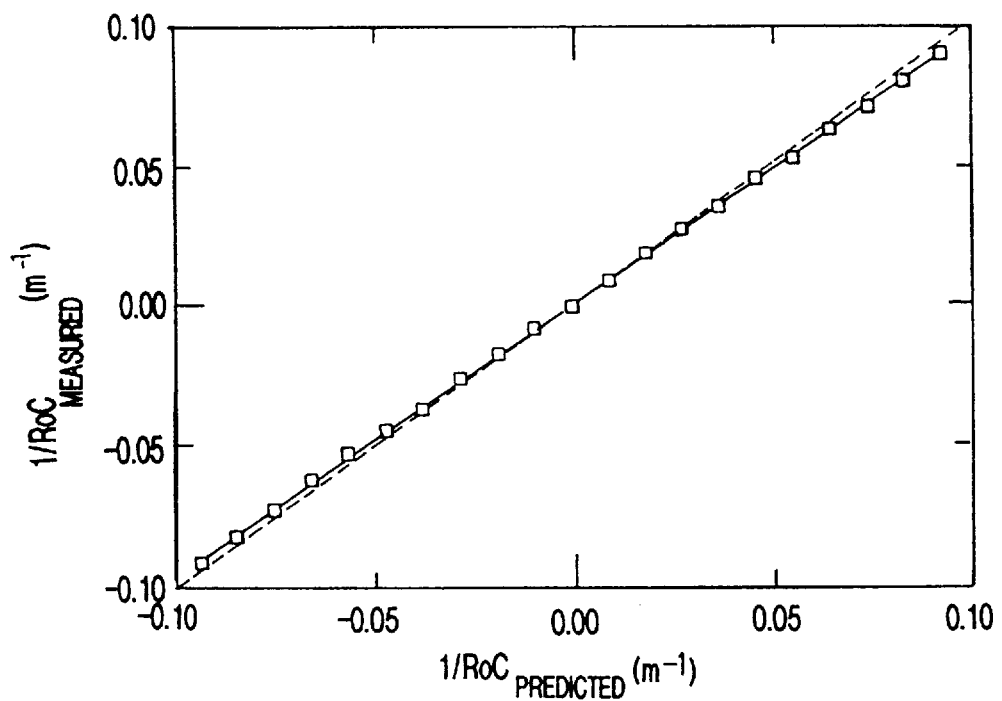
Figure 16:
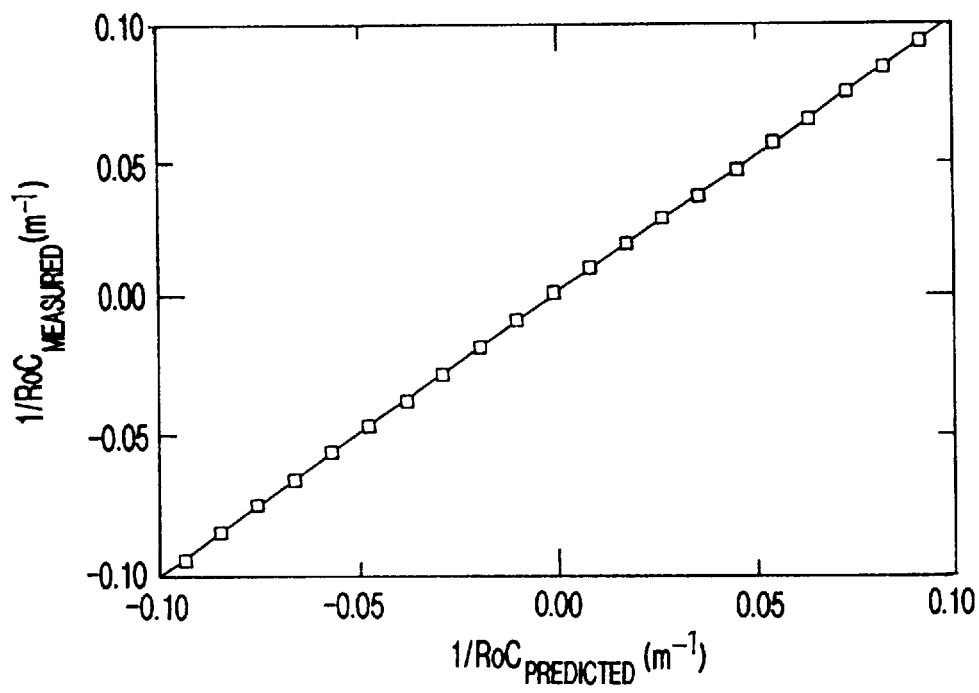
Figure 19:
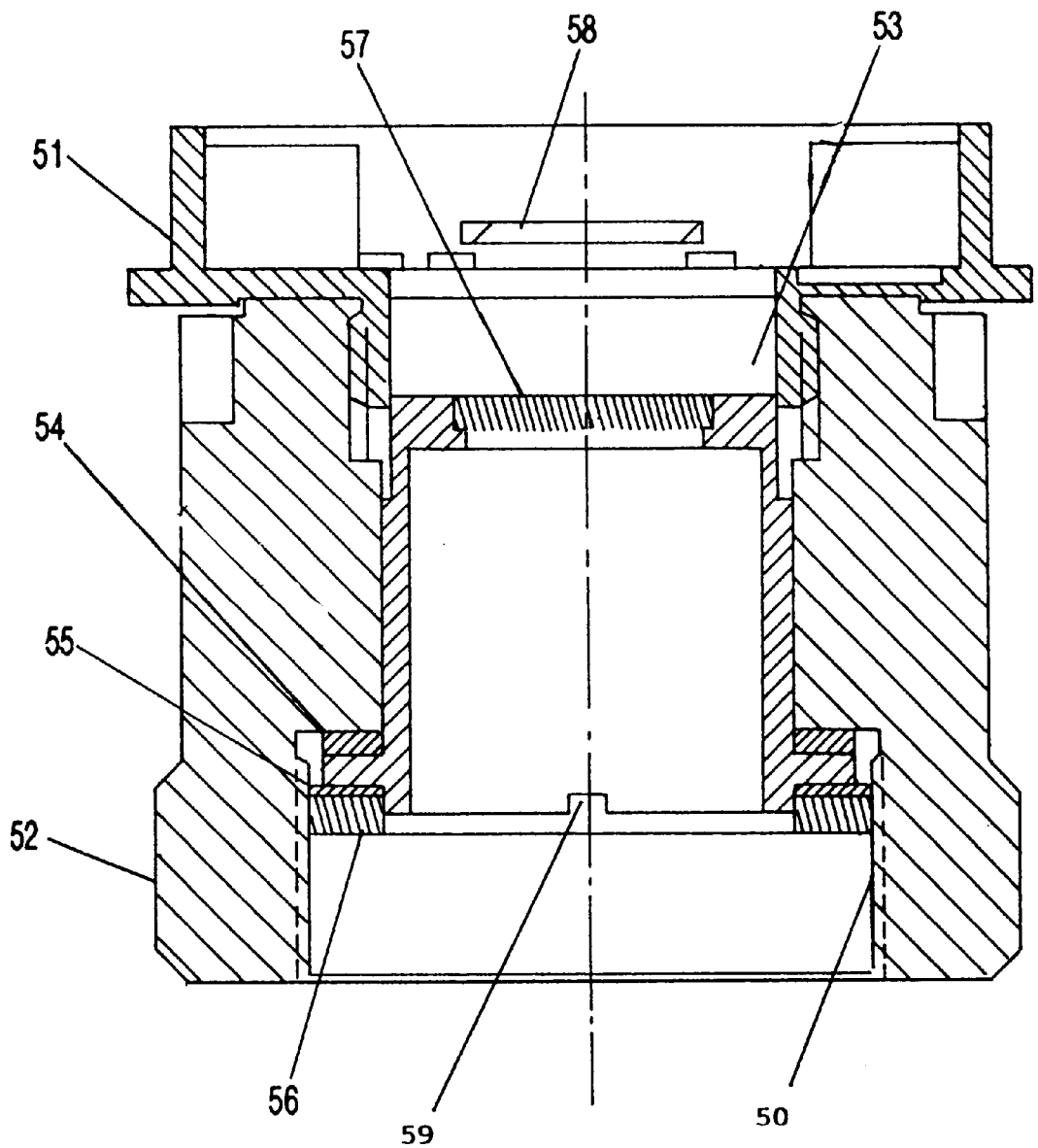
Figure 20:
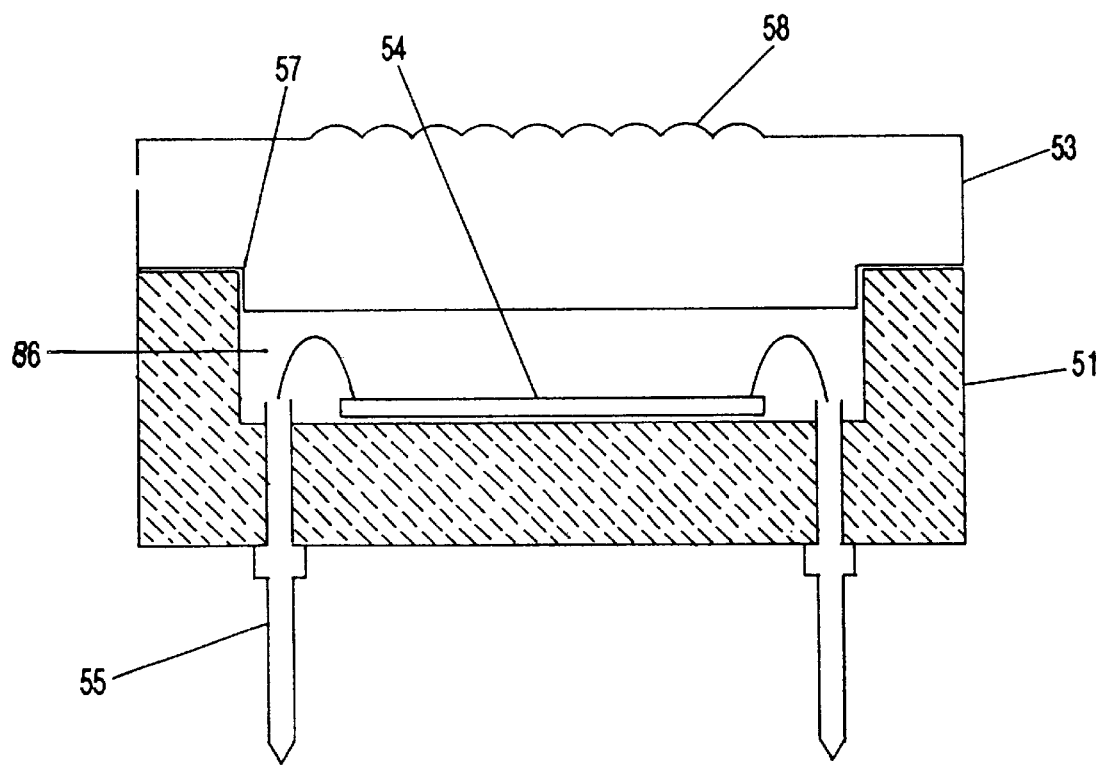
Figure 21:
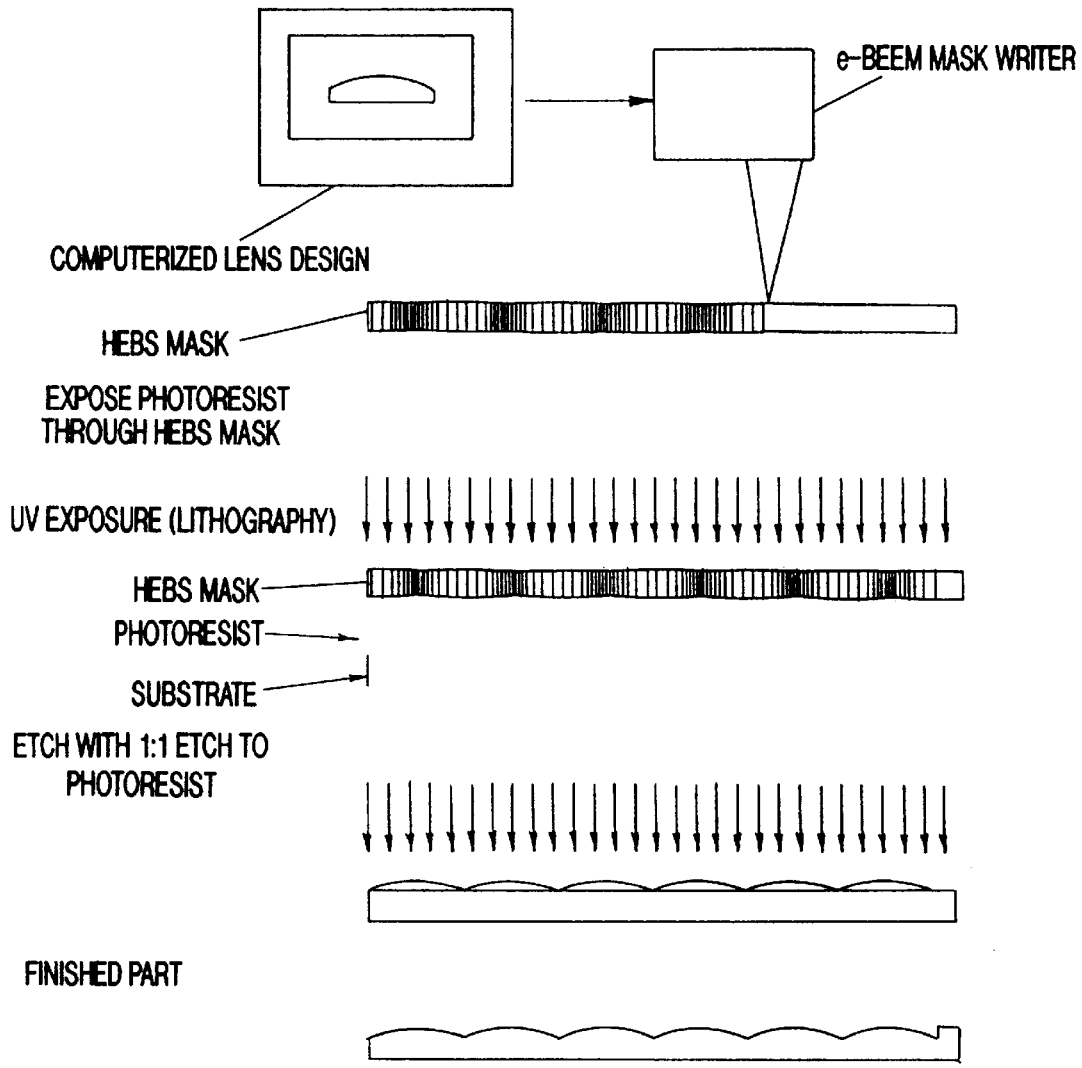

for both modeled beams, the calculated $M^2$ parameter is unity throughout the range of propagation;

FIG. 8 is a graph of a beam profile of hyperbolic secant squared beam with the modeled beam propagated using LightPipes;

FIG. 9 is a graph showing the effect of wavefront error on $M^2$ for various levels of selected aberrations;

FIG. 10 is a graph of calculated $M^2$ versus beam size for Gaussian beam modeled at waist; for a detector consisting of a 40×32 array of lenslets, each 250 $\mu$m on a side; once detectable beam energy no longer falls on the detector, there is a loss of irradiance in the higher spatial frequencies, resulting in a decrease in the $M^2$ parameter;

FIG. 11 is a graph showing the effect of increasing the number of lenslets across the aperture;

FIG. 12 illustrates the binary optic fabrication sequence for a micro optic with four phase levels, as taught by Swanson;

FIG. 13 is a schematic of the test setup for calibrating a wavefront sensor of the invention; the second lens 14 is adjusted to provide different amounts of wavefront curvature to the sensor;

FIG. 14 is a three-dimensional plot of the curved wavefront measured with the wavefront sensor of the invention for a 0.95 m radius of curvature wavefront;

FIG. 15 is a graph of the measured radius of curvature versus incident radius of curvature; the slope error reprents a displacement of the lenslet array by 0.01" from the nominal focal plane;

FIG. 16 is a graph of the measured radius of curvature versus incident radius of curvature after adding appropriate shims; the slope of near unity indicates the lenslet array is positioned one focal length from the detector;

FIGS. 17(a) and (b) display a HeNe beam measured with the wavefront sensor of the invention: (a) Beam irradiance; and (b) Beam phase;

FIG. 18 is a table of calculated $M^2$ obtained from various HeNe laser beams using the wavefront sensor and other methods of the invention;

FIG. 19 illustrates one embodiment of the rigid sensor/detector array combination of the invention;

FIG. 20 illustrates a second embodiment of the rigid sensor/detector array combination of the invention;

FIG. 21 depicts the sequence of operations needed to fabricate micro optics using the gray scale process;

FIG. 22 depicts a rigid mount sensor for large format CCD cameras; and

FIG. 23 depicts using the camera itself as the mount body for a rigid mount sensor.

DESCRIPTION OF THE PREFERRED EMBODIMENTS (BEST MODES FOR CARRYING OUT THE INVENTION)

Figure 1:
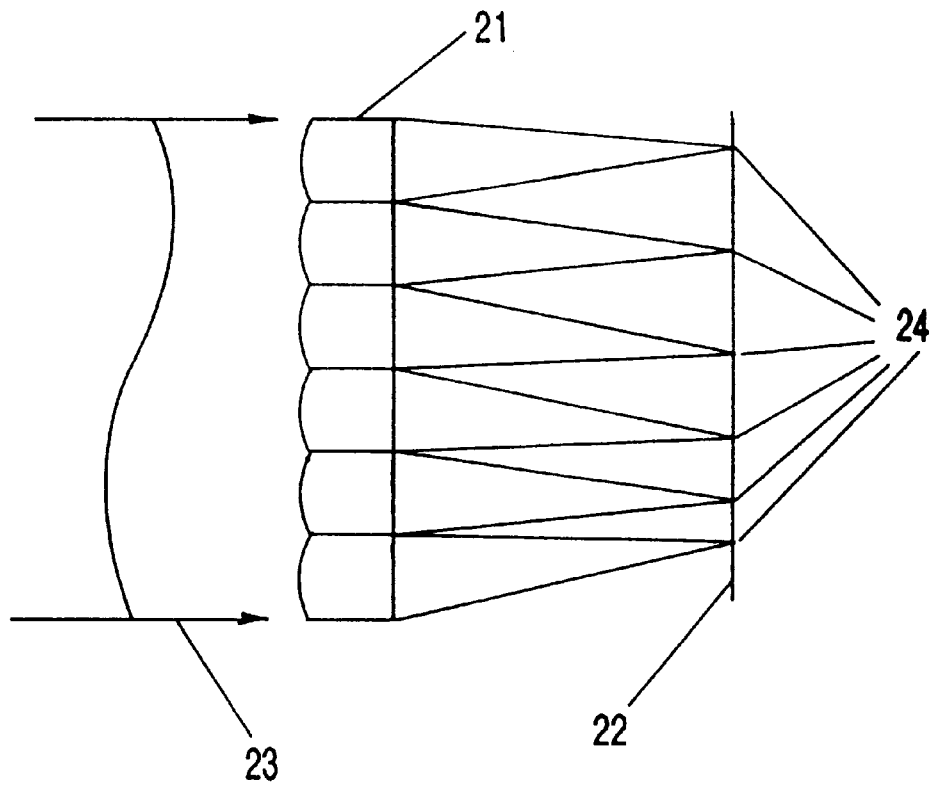
FIG. 1 illustrates the basic configuration of a wavefront sensor.

The present invention is of a two-dimensional (preferably Shack-Hartmann) wavefront sensor that uses micro optic lenslet arrays to directly measure the wavefront slope (phase gradient) and amplitude of the laser beam. Referring to FIG. 1, this sensor uses an array of lenslets 21 that dissects the beam 23 into a number of samples. The focal spot locations 24 of each of these lenslets (measured by a detector array 22) is related to the incoming wavefront slope over the lenslet. By integrating these measurements over the laser aperture, the wavefront or phase distribution can be determined. Because the power focused by each lenslet is also easily determined, this allows a complete measurement of the irradiance and phase distribution of the laser beam. Furthermore, all the information is obtained in a single measurement. Knowing the complete scalar field of the beam allows the detailed prediction of the actual beam's characteristics along its propagation path. In particular, the space-beamwidth product, $M^2$, can be obtained in a single measurement. The irradiance and phase information can be used in concert with information about other elements in the optical train to predict the beam size, shape, phase and other characteristics anywhere in the optical train. For purposes of the specification and claims, "characterization" means using information gathered about an energy beam to predict characteristics of the beam, including but not limited to size, shape, irradiance and phase, anywhere in the train of the beam.

The time-independent electric field of a coherent light beam directed along the z-axis can in general be described by its complex amplitude profile, $\overline{E}(x, y; z) = |\overline{E}(x, y; z)| \exp[i\phi(x, y; z)]$.

The phase $$\varphi = \frac{2\pi}{\lambda} \phi(x, y; z),$$

where $\phi(x, y)$ is the wavefront or optical path difference referenced to the wavefront on the z-axis. The wavefront is also defined as the surface normal to the direction of propagation. Due to rapid temporal oscillations at optical frequencies, it is not possible to directly measure the electric field. However, by using a Shack-Hartmann wavefront sensor, one can indirectly reconstruct a discrete approximation to the time independent electric field at a given plane normal to the z-axis.

A Shack-Hartmann sensor provides a method for measuring the phase and irradiance of an incident light beam. The sensor is based on a lenslet array that splits the incoming light into a series of subapertures, each of which creates a focus on a detector (usually a CCD camera) (see FIG. 1). The wavefront of the incoming beam is defined as a surface that is normal to the local propagation direction of the light. Hence distorted light will have a wide collection of propagation directions and the separate lenslets will focus the light into different positions on the detector. By determining the position of each of these focal spots the wavefront slope over the lenslet can be measured. The wavefront itself must be reconstructed by integrating these wavefront slope measurements.

There are several steps in wavefront sensor data reduction. First the sensor is placed in a reference beam and data is acquired with a camera for calibration. Since there are a large number of focal spots in the field, the image must be divided into a set of small windows, each centered on a focal spot peak, with one window per lenslet. Once the windows have been found, a centroid is computed using a center-of-mass algorithm:

$$\rho_{x,l} = \frac{\sum_{(i,j) \in W_l} I_{ij} x_i}{\sum_{(i,j) \in W_l} I_{ij}}. \tag{1}$$

With pixels indicated by the i,j indices, a sum is made over the pixels in each window ($W_l$, where l indicates a particular lenslet) of the irradiance-weighted locations. (When not mentioned explicitly, similar equations hold for the y-axis.) This results in a reference set of centroids, $\rho_{x,l}|_{REF}$ and $\rho_{y,l}|_{REF}$. The sensor is now ready for acquisition and measurement of actual data. Note that the reference beam need not be a collimated beam, as long as its characteristics are known; results are then deviations from this reference.

Figure 2:
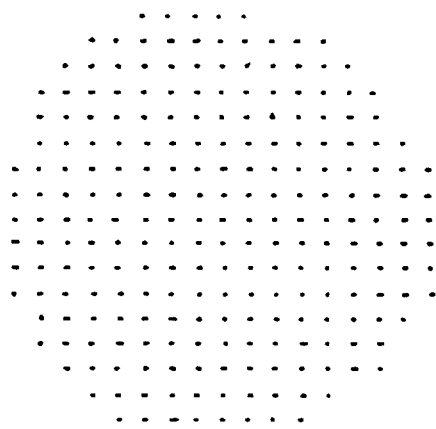
FIG. 2 is an image of data from a Shack-Hartmann sensor; light gray spots are the centroid positions of a calibration beam.

The first step in analyzing real data is the same as that for the reference data. The data is acquired and digitized and then centroids are computed using the windows calculated in the reference step. A typical image is shown in FIG. 2. Once these centroids have been obtained, and with the lenslet to CCD distance, L, known, the wavefront slopes can be calculated:

$$\theta_{x,l} = \frac{\partial \phi}{\partial x_l} = \frac{\rho_{x,l} - \rho_{x,l}|_{REF}}{L}. \tag{2}$$

Figure 3:
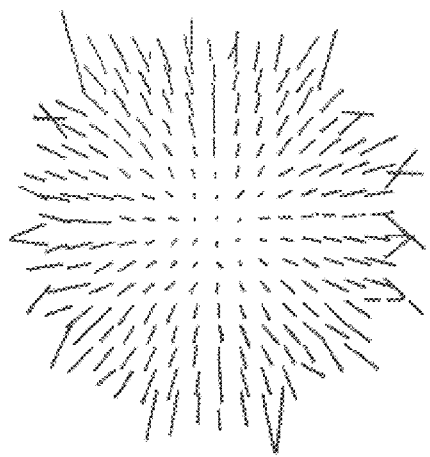
FIG. 3 is a vector plot displaying wavefront slopes of an expanding beam.

FIG. 3 displays an example of this calculation for an expanding beam.

The final step is the wavefront reconstruction. This is the solution of the gradient equation, $$\overline{\nabla}\phi = \frac{\partial \phi}{\partial x}\hat{i} + \frac{\partial \phi}{\partial y}\hat{j}, \tag{3}$$

where the data provides sampled values for the wavefront gradient, $$\left.\frac{\partial \phi}{\partial x}\right|_l = \theta_{x,l} \text{ and } \left.\frac{\partial \phi}{\partial y}\right|_l = \theta_{y,l} \tag{4}$$

Here $\theta_x$ and $\theta_y$ are the measured slope data. The reconstruction proceeds by finding a set of $\phi_l$ values that obey the above equations. Commonly used methods include least-squares procedures and marching methods. Southwell teaches a variety of methods for solving Eq. 4.

One method that has advantages in that it takes account of the irradiance distribution as well as the phase slopes is known as the modal reconstruction method. In this method the data is fit to the derivatives of an analytical surface described by an expansion in terms of a set of basis functions. One simple case is the use of a polynomial expansion. Thus the phase might be described by $$\phi = \alpha_{00} + \alpha_{10}x + \alpha_{01}y + \alpha_{11}xy + \ldots + \alpha_{ij}x^i y^j. \tag{5}$$

Figure 4:
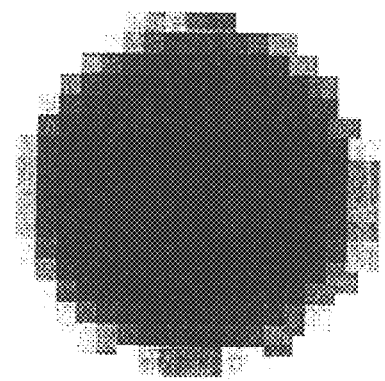
FIG. 4 is a phase map for a Helium—Neon (HeNe) laser beam, with tilt removed; curvature dominates the phase structure.
Figure 5:
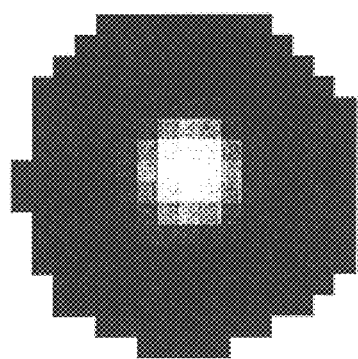
FIG. 5 is an irradiance map for the Helium—Neon laser.

This description uses normal polynomials in x and y. Different basis sets may also be used, such as Hermite and Zernike functions. The derivatives of the phase are then easily determined by $$\frac{\partial \phi}{\partial x} = a_{10} + a_{11}y + 2a_{20}x + \ldots + ia_{ij}x^{i-1}y^j, \tag{6}$$

with a similar expression for the y-derivative. Eq. 6 is then fit to the wavefront slope data using a least-squares method. Since Eq. 5 determines the wavefront phase in terms of these $a_{ij}$ (with an arbitrary constant of integration, $a_{00}$, which is usually set equal to zero), the complete wavefront has been determined. The irradiance for each lenslet is determined by the denominator of Eq. 1. FIGS. 4 and 5 illustrate a typical phase and irradiance distribution obtained by this method.

The above provides a complete measurement of the beam irradiance and phase, sampled by the lenslets. This measure is from a single time and location. It can be used for calculation of other parameters of interest, such as $M^2$ as discussed below. In addition, the reconstructed wavefront can be numerically propagated to another location using a standard propagation code (e.g., LightPipes or GLAD) or other propagation method.

Shack-Hartmann wavefront sensors have been used for many years as sensors for adaptive optics in military high energy laser and atmospheric compensation. However, recently they have been applied to measurement applications in thermal flow, turbulence and surface measurement. While some of these early sensors were one dimensional in order to make high bandwidth measurements, recently fully two-dimensional sensors have been developed.

One of the chief limitations on making wavefront sensors is the fabrication of an appropriate lenslet array. Early lenslet arrays were either individually ground and polished lens segments that were assembled together, or were fabricated with step and repeat processes. With the advent of micro (continuous, diffractive, or binary) optics technology, the methods for fabricating lenslet arrays have greatly improved. This technology is discussed in detail in parent U.S. patent application Ser. No. 08/678,019.

Micro optics technology is the application of integrated circuit manufacturing technology to the fabrication of optics. Swanson, et al. (U.S. Pat. No. 4,895,790) developed a process for the fabrication of micro optics known as binary optics. In this process, described in FIG. 12, a series of high contrast masks are used to construct the desired surface profile. Through accurate alignment of each new mask to the structure fabricated in the previous step, the desired optic may be approximated by a binary structure, much like a binary number can be used to represent higher values, even though only ones and zeros are used.

There have been many additional means developed for fabricating micro optics. The photolithography etching processes may be used, but it is helpful to reduce the requirements for multi-mask alignment and the number of required masks. Through the use of special gray mask materials, such as High Energy Beam Sensitive (HEBS) glass (U.S. Pat. No. 5,078,771, to Che-Kuang Wu), the desired structure may be encoded as optical density variations in the mask. This allows a single mask, with a single exposure, to be used to fabricate the entire structure. In the present invention, micro optic fabrication method or methods may be used, however the gray mask process may have advantages of resolution and ease of fabrication in the present invention. The steps needed to create an optic using the gray mask process of the invention are as follows and are shown in FIG. 21:

1. The design of the optic is developed using a series of computer programs to describe the desired lenslet shape and profile. These include a code to define the shape and placement that solves the exact Huygens-Fresnel equations for a lens, a diffractive analysis code, a photomask layout tool, and various other elements as needed to produce a complete digital description of the lens or lens array.

2. A photomask is fabricated using the digital data described above whose optical density is a direct function of the desired final optic surface profile height. This mask may be fabricated through a number of methods, including the use of e-beam sensitive material, variable thickness metal or other coating layer, or though other techniques as appropriate.

3. A thin layer of photoresist is spun onto the substrate (which may be made of fused silica or other appropriate optical material). The mask pattern is transferred to this layer by uv contact or projection lithography. Once the photoresist is developed, it assumes a surface profile shape similar, and directly related through a known function to, the shape of the desired lens.

4. The substrate and photoresist is etched using chemical, reactive-ion, ion-milling, or other etching process that etches both materials until all of the photoresist has been removed. At this point, a replica of the lens surface profile has been produced in the substrate.

This series of steps can result in lens profiles that are produced with no alignment between successive steps, a single etch step, and a much smoother profile. With this method, extremely high precision lens arrays can be made. They have an extremely precise surface profile, with features down to 1 micrometer and 100% fill factor. Furthermore, they can be arranged in many different configurations to compensate for other effects in the optical system, as taught in parent application Ser. No. 08/648,019.

The other necessary item to make a wavefront sensor is a detection device, preferably a CCD, CID, or CMOS camera. Off-the-shelf cameras, which are low cost, yield excellent results. The camera is interfaced to a frame grabber for data acquisition into the computer. Once data is acquired, the analysis proceeds along the lines described above. Other detection means may be used to take advantage of various detector technologies to improve or modify dynamic range, sensitivity, frequency response, spectral sensitivity, and so forth.

In the preferred embodiment, the lenslet array is mounted directly in front of the detector, as appropriate to the application, in a rigid assembly (preferably at the focal point of the lenslet array) with no optical or other elements located between the lenslet array and the detector. In this arrangement, the sensor head is extremely compact and lightweight. This means that the sensor can be mounted on common optical mounts, or easily incorporated into other optical systems. This is a significant advantage in some cases where there are severe restrictions on space and weight. The resulting sensor design is extremely rugged and robust, and has no moving parts. This allows use in non-ideal environments. By coupling with electronic shuttering or pulsed light sources, the sensor can be used in high vibration environments, such as industrial production-line environments, that would otherwise preclude the use of sensitive optical instruments. For many applications, small size, weight, and vibration insensitivity allow measurements to be made that were not possible otherwise.

Accurate wavefront slope measurements require that the lenslet array be located a precise, known distance from the detector. There are a number of means to achieve mechanically rigid, precision spacing. This spacing must be precisely and rigidly controlled, and must be adjusted through a calibration step to a known, predetermined value. Therefore a means is needed for positioning, measuring, and adjusting this lenslet position.

Preferred embodiments of the present invention provide an enhanced, practical sensor that is compact, robust, and insensitive to vibration. It must be noted that the utility of the rigid mount embodiments is not limited to only measurement of laser or energy beams. By directly affixing the lenslet array in front of the detector, with no intervening optics, a number of advantages are achieved. The combined instrument can be made extremely compact and lightweight. In most cases, the combined instrument is barely larger than the CCD camera itself. This enables a large number of applications where the sensor head can be placed into an existing optical system. For example, a small telescope can be tested by mounting the sensor head directly onto the telescope eyepiece. The small size of this arrangement is the only thing that makes this possible because the telescope eyepiece and mount cannot support any significant load. Any sensor that has internal optics will be much larger. When built as a total instrument, this means that the optical system will need to be aligned to the sensor that is fixed on some optical table. The size of such an instrument is determined by the internal optical system. While such optical systems can be made somewhat compact with sophisticated optics and opto-mechanics, the system will still be significantly longer and heavier than a direct lenslet array mount.

A rigid mount will greatly reduce sensitivity to vibration. In some of the prior art, the lenslet array has been mounted on an adjustable stage that allows several degrees of freedom. This allows adjustment for alignment in x and y, rotation, and focus. In addition, lenslet array tip and tilt have often been adjustable. These adjustments require the use of opto-mechanical systems that are much larger and more complicated than a robust mounting scheme. More importantly, they are sensitive to vibration. While the use of such a mount allows for adjustment of the lenslet array relative to the camera, it means that vibration, inadvertent adjustment or other force may cause a misalignment of the system. Thus vibration can easily induce conditions requiring realignment, new reference files, or worse.

A rigid mount also preferably completely seals the optical path between the lenslet array and the detector. Therefore, turbulence, dust, and other effects will be minimized. With an adjustable mount this seal is very difficult to maintain. This is very important since it is desirable to use a glassless CCD which may be permanently damaged by dust. This seal may also be used to protect CCD imagers that may be damaged by moisture or exposure to oxygen.

Furthermore, the mount acts as a heat sink for the camera and eventually brings the lenslet array, mount and CCD camera to the same temperature. This reduces any temperature gradients that would otherwise induce turbulence. If the camera is calibrated in this condition, this greatly improves the overall stability of the instrument, because minimal changes in temperature induced expansion would be expected.

A properly designed rigid mount will serve to enhance the stability of the CCD/lenslet assembly. In many CCD cameras the CCD imager is mounted in a socket that is soldered to a printed circuit (PC) card. The PC card is mounted with screws to the camera body. Thus, the only connection that determines the position of the CCD imager is through the PC card, which may be made of fiberglass, phenolic or some other flexible material. A properly designed rigid mount will preferably include replacing the camera front plate so that a firm contact is achieved between the camera front plate/lenslet mount assembly and the frame of the CCD imager.

To make an effective rigid mount, a number of objects should preferably be achieved. The mount should completely encapsulate the lenslet array. It should position the lenslet array precisely at the required distance from the CCD. It should completely seal the CCD imager against dust and other foreign objects. It should mount against the frame of the CCD imager to provide a complete rigid and stiff assembly. The mount should have provision for changing the spacing of the lenslet array relative to the CCD imager without compromising the stability and robustness of the system, and it should provide a means for fixing the rotation of the lenslet array relative to the CCD imager.

Previous implementations of wavefront sensors have been mostly research oriented in nature. It is common practice to place a lenslet array in front of a detector and so build a Shack-Hartmann wavefront sensor. However, one is immediately faced with issues such as alignment, lenslet to CCD spacing, and lenslet array rotation. In the prior art, these problems are routinely solved by one of two methods:

1. Mount the camera and lenslet array in separate adjustable mounts.
2. Use a relay-imaging lens to image the plane of the focal spots (or other plane as desired) onto the detector.

While both of these methods have some advantages, they do not offer the advantages of the robust rigid assembly of the invention. Most wavefront sensors that have been built for adaptive optics research use a combination of these two methods. In the research environment, this allows for flexibility in the use and development of the instrument.

There are two implementations of commercial sensors that both employ the relay imaging lens method. In the WaveScope™, built by Adaptive Optics Associates, a magnetic mount is provided for the lenslet array and a relay lenslet is mounted directly on the camera. The camera/lens assembly is mounted on an adjustable stage that may be moved relative to the lenslet array for calibration or other purpose. This system is over ½ m in length, and clearly is not a compact, robust, rigid assembly. This instrument is described in part by U.S. Pat. Nos. 4,490,039, 4,737,621, and 5,629,765. In the Zeiss wavefront sensor, the Detect™ 16, 32 or 64, is much more compact. However, it also uses an internal relay imaging lens. While this system may achieve some of the advantages in terms of compactness, the use of the relay lens introduces cost, complexity and may reduce the accuracy of the final system due to aberrations of the internal relay lens. While low aberrations lenses could be used in this configuration, this would likely result in a much larger package and higher cost, thereby obviating the compactness advantage.

The present invention is a derivative of a Shack-Hartmann sensor, which is used to measure an incoming wavefront distribution. It should be noted that the wavefront dissector may be a lenslet array, diffraction grating array, array of holes, or any other means for creating a set of spots or separated regions of light on the detector in a known manner, and "wavefront dissector" is so defined for purposes of the specification and claims.

If the wavefront dissection element is arranged in a rigid and robust mount, there are a number of advantages. These include compactness, insensitivity to vibrations, freedom from calibration drift, enhanced accuracy, better temperature stabilization and easier operation. In order to achieve the advantages of a practical wavefront sensor, the sensor should be designed to be compact, rigid and robust. There are a number of means for achieving these ends.

There are two preferred embodiments for this positioning. The first is shown in FIGS. 19, 22, and 23. In FIG. 19, the lenslet array 57, is mounted in an insert 53, which is custom fit to the size and shape of the particular lenslet array. Different inserts may be used that are matched to the lenslet array focal length and required position. The lenslet array 57 may be glued or otherwise affixed to the insert 53. The insert/lenslet array assembly is positioned in a sensor body 52 which is firmly attached to the detector front plate 51. The sensor body is mounted with threaded 50 or other means with considerable torque so that the camera front plate and the sensor body are an integral assembly, with no possibility of relative motion. Special tools may be required to accomplish this attachment step. The CCD or other detector 58 is mounted to the camera front plate 51 in a rigid manner with the use of shims or other means so that precise physical contact is maintained between the detector chip frame and the camera front plate. This assures that the sensor body will maintain precise physical spacing and alignment to the detector element.

To mount the lenslet array/insert assembly to the sensor body 52 at a known spacing, the following elements are used. One or more shims 54 of a precise thickness and character are used between a step in the sensor body and the insert. The thickness and selection of these shims can be determined in a calibration step described below. A nylon or other low friction material 55 is used between the insert 53 and the retaining ring 56 to prevent rotation during final assembly and tightening. The lenslet array 57 and detector 58 are rotationally aligned relative to one another by rotating the insert 53 relative to the sensor body 52. This is accomplished through the use of a special tool that is designed to interface to notches or tabs 59 on the insert 53. This rotation step may be accurately accomplished while monitoring the position of the focal spots electronically while rotating the insert/lenslet assembly.

In some embodiments, it may be preferable to replace the front plate of the camera to assure this contact. It may also be desirable to provide for an o-ring seal or for fittings to allow purging with clean air or nitrogen.

A similar concept can be used for different size cameras, wavelengths, or other operation. FIG. 22 is an example of a mount that is used for a large-format IR camera. The lenslet in this case is made from silicon because the instrument is designed for operation from 1.1–1.7 mm. The mount is similar in design and construction to the mount described in FIG. 19, except scaled to the larger lenslet array and camera dimensions. The sensor body 72 screws into the camera faceplate 71 with large diameter threads. The camera faceplate has provision for an o-ring seal 79 to completely enclose the optical path between the lenslet array 77 and the detector 78. In other configurations, a port for a nitrogen purge line is also preferably provided. This assembly has the same basic concept with the insert 73, shims 74, slip ring 75, and insert retainer 76.

While this design has the advantage of easy assembly and rotation, it is also possible to construct simpler, lower cost designs. FIG. 23 is an example of a configuration where the threads of the camera itself are used as the primary mounting elements for the lenslet array. To achieve all of the objectives of the rigid mount, a camera must be used that has a rigid mounting of the CCD chip 39 with CCD detector 34. The lenslet array 36 is mounted with epoxy or other means in an insert 37 which slips into the camera front mount. It may be either free to rotate, or arranged with threads to allow linear adjustment. Ideally it should contact the frame of the CCD chip 39. Shims 31 may be used to adjust the axial position. Notches 33 may be used to allow a tool to rotate the insert assembly. A retaining ring 32 fixes the elements and holds everything in alignment in conjunction with slip ring 38 and camera front plate 30. This arrangement has the advantage of fewer parts and simpler mechanical systems. However, it relies on the internal organization of the camera to be a rigid sealed assembly. This may be true for some cameras, but for some it is not adequate.

While shims are discussed as a means for rigidly fixing the lenslet to detector spacing, other means are also useful. This may include the use of a threaded assembly with a locking mechanism or other means as appropriate.

In another embodiment shown in FIG. 20, the lenslet array 88 is designed with mounting means directly on the lenslet substrate 83. In this embodiment, the lenslet array is arranged with a special mounting surface 87 that is designed to interface to the frame for the detector 81. The detector sensitive surface 84 is mounted rigidly with epoxy, solder, or other means to the detector frame 81. The detector frame 81 has sufficient depth for the wire bonds 86. It also holds pins or other connection means 85 for electrical connection to other circuits. Precision machining of the various components is used to assure the proper separation of components. The lenslet array substrate 83 is fixed to the detector frame 81 using UV cured epoxy or other means. The mounting surface 87 is designed such that there is sufficient space to allow for slight rotational alignments. The use of UV cured epoxy allows the position of focal spots to be monitored during an alignment step while the epoxy is in place but not yet set. Once the final position has been obtained, then the epoxy is set by application of UV light. This embodiment allows for an extremely compact, hermetically sealed and robust sensor, in configurations where the detector is not mounted in a separate mechanical fixture.

In order to use these rigid assembly embodiments, the lenslet-to-CCD distance, L in Eq. 2, must be determined experimentally. To accomplish this objective (referring to FIG. 13), an optical system 10, comprising laser 16 and lenslet array 18 and detector array 20 (rigidly assembled to the lenslet array to form a wavefront sensor) as shown in FIG. 13 is preferably used to introduce various amounts of wavefront curvature in a known fashion. A pair of achromatic lenses 12 and 14 spaced 2 f apart are examples of devices which may be employed. By adjusting the position of the second lens 14 slightly (e.g., with a micrometer driven translation stage), data with known curvature as shown in FIG. 14 may be generated. Aberrations in the lenses can be dealt with by referencing the wavefront sensor with light that passes through the same lenses at exactly 2 f spacing. It is not necessary to use two lenses in this configuration. A rotating wedge, a single lens with a point source and an accurate tip/tilt stage, or other means for introducing low order wavefronts with known character can be employed.

To calibrate the sensor by determining the exact separation L of lenslet and CCD, data is acquired as a function of the position of lens 14. A typical summary of this data is presented in FIG. 15, as a plot of measured wavefront curvature versus input curvature. The slope of this line is related to the exact distance between the lenslet array and the detector. Using this information, this distance can be adjusted to produce an exact match between nominal lens focal length and camera to lens spacing, preferably through the use of shims or other means that maintain the rigid nature of the wavefront sensor. Setting L=f (where f is the lenslet focal length) produces the smallest spot size, allowing the largest dynamic range on the sensor. This positioning procedure allows for an accurate determination of L. Typical post-positioning data after adding the appropriate shims is shown in FIG. 16. This procedure allows the wavefront sensor to be accurately calibrated even though a rigid mounting system for the lenslet array is used. Of course, the same procedure may be used to set the distance to any desired value.

One commonly used parameter for characterizing laser beam quality is the space-beamwidth product, or $M^2$ parameter. Let the complex electrical field distribution of a beam directed along the z-axis be given by $\tilde{E}(x, y, z)$, with the corresponding spatial frequency domain description of the beam, $\tilde{P}(s_x,s_y,z)$ given by its Fourier transform, $\tilde{P}(s_x,s_y,z)=\Im\{\tilde{E}(x, y, z)\}$. Beam irradiances in each domain are then defined by $I(x, y, z)\equiv|\tilde{E}(x, Y, z)|^2$ and by $\hat{P}(s_x,s_y,z)\equiv|\tilde{P}(s_x,s_y,z)|^2$. The $M^2$ parameter is then defined by:

$$M_x^2 = 4\pi\sigma_{x_o}\sigma_{s_x} \qquad (7)$$

where $\sigma_x$ is irradiance weighted standard deviation at position z in t x-direction, defined by $$\sigma_x^2(z) = \frac{\int\int (x-\bar{x})^2 I(x, y, z) dx dy}{\int\int I(x, y, z) dx dy} \qquad (8)$$

and $\sigma_{s_x}$ the spatial-frequency standard deviation of the beam along the x-axis $$\sigma_{s_x} = \frac{\int\int (s_x-\bar{s}_x)^2 \hat{I}(s_x, s_y) ds_x ds_y}{\int\int \hat{I}(x, y, z) ds_x ds_y}. \qquad (9)$$

Note that $\sigma_{s_x}^2$ is not a function of z, and can be obtained using the Fourier transform of the electric field.

(The first moments of the beam along the x-axis and the $s_x$-axis are indicated by $\bar{x}$ and $\bar{s}$, respectively. The spot size of the beam is $W_x(z)\equiv 2\sigma_x$. The corresponding y-axis quantities hold for $\sigma_{y_o}$, $\sigma_{s_y}$, etc., mutatis mutandis, throughout this description. In addition, the normalizing factor in the denominators shall be indicated by $P=\int\int I(x, y, z_1)dxdy=\int\int \hat{P}(s_x,s_y, z)ds_x ds_y$.)

In the case of a paraxial beam in the z-direction, with an arbitrary reference plane ($z_1$), the irradiance weighted standard deviation will have an axial distribution given by, $$\sigma_x^2(z)=\sigma^2(z_1)-A_{x,1}\times(z-z_1)+\lambda_{s_x}^2\sigma_{s_x}^2\times(z-z_1)^2 \qquad (10)$$

where $A_{x,1}$ is given by the function $$A_x(z_1) = \frac{\lambda}{\pi P}\int\int_{-\infty}^{\infty} dx dy x \times |\tilde{E}(x, y, z_1)|^2 \frac{\partial\phi(x, y, z_1)}{\partial x}. \qquad (11)$$

The beam waist, or location of minimum irradiance variance, is obtained from Eq. 10:

$$(z_{x_0} - z_1) = \frac{A_{x,l}}{2\lambda^2\sigma_{s_x}^2}. \qquad (12)$$

Substituting back into Eq. 10 yields the relationship $$\sigma_{x_0}^2 \equiv \sigma_x^2(z_1) - \frac{A_{x,l}^2}{4\lambda^2\sigma_{s_x}^2}. \qquad (13)$$

$M_x^2$ follows immediately from Eq. 7.

These formulas form the basis for defining the space-beamwidth product, $M^2$ To calculate $M^2$ from discrete irradiance and phase measurements requires appropriate processing of the data. The present invention provides three exemplary methods of equal validity, dependent upon experimental parameters such as instrument noise, resolution, and dynamic range, or depended upon wavefront and irradiance distribution characteristics. The three methods may be summarized as gradient method, curvature removal method, and multiple propagation method, and are next discussed.

It should be noted that Eqs. 13 and 11 are not derived from series expansions in the vicinity of the beam waist, but are analytical derivations dependent only upon the paraxial wave equation, the paraxial propagation assumption, and the Fourier transform relationships between the complex electric field amplitude ($\tilde{E}(x, y, z)$) and the spatial-frequency beam description ($\tilde{P}(s_x, s_y, z)$).

Gradient Method. As shown previously, it is possible to obtain a discrete description of the beam electric field amplitude and phase in a given plane normal to the z-axis. As part of the measuring process, discrete values for $$\frac{\partial \phi}{\partial x} \text{ and } \frac{\partial \phi}{\partial y}$$

are also obtained. By means of the above formulae and standard numerical integration techniques one can then obtain values for $M^2$ and the waist locations, $Z_{ox,y}$.

Figure 6:
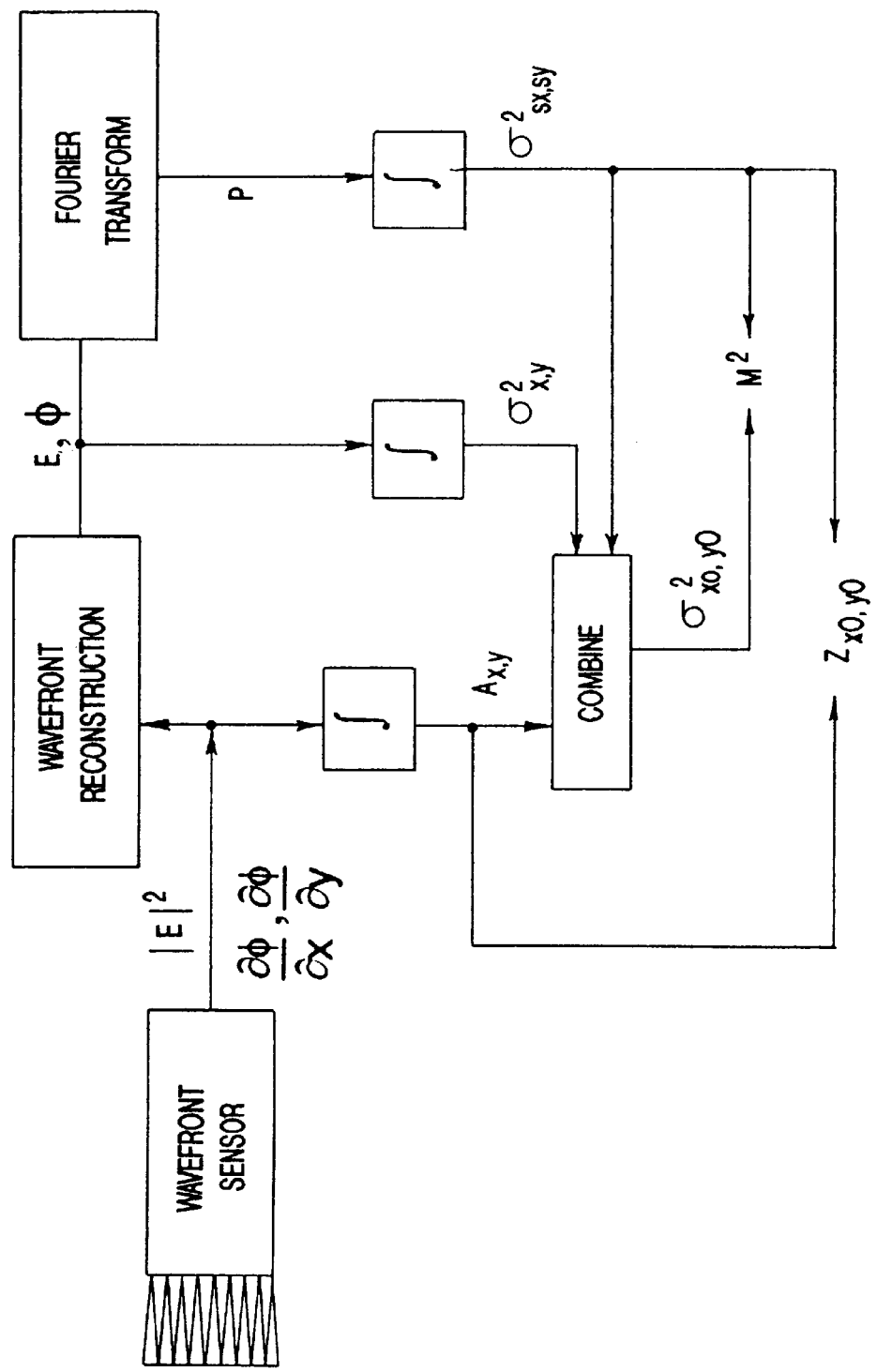
FIG. 6 illustrates computation of waist location and $M^2$ in a single measurement; Shack-Hartmann sensor gives a set of wavefront slopes and intensities used to reconstruct an electric field wavefront (normalized to zero phase on the z-axis); spatial frequency field is obtained by Fourier transform; application of other relationships described in the text yield waist location and the $M^2$ parameter.

The sequence is as follows, and is referred to as the gradient method. (See FIG. 6.) From the Shack-Hartmann sensor, the distribution of irradiance, $I(x, y, z_1)$ and wavefront slope, $$\frac{\partial \phi}{\partial x} \text{ and } \frac{\partial \phi}{\partial y}$$

are obtained. From these, the electric field, $$\tilde{E}(x, y, z_1) = \sqrt{I(x, y, z_1)} \exp\left(i\frac{2\pi}{\lambda}\phi(x, y, z_1)\right),$$

is calculated. The spatial-frequency electric field distribution, $\tilde{P}(s_x, s_y, z_1)$, is derived using a Fourier transform algorithm, such as the fast Fourier transform (FFT). From these the irradiance distributions in both domains, $I(x, y, z_1)$ and $\hat{P}(s_x, s_y, z_1)$, are obtained, whence numerical values for the variances, $\sigma_x^2(z_1)$ and $\sigma_{s_x}^2$ are calculated. Concurrently, the integral of Eq. 11 is computed by using the directly measured values of $$\frac{\partial \phi(x, y, z_1)}{\partial x} \text{ and } \frac{\partial \phi(x, y, z_1)}{\partial y},$$

with the results being used in Eqs. 13 and 12 to produce the waist location and irradiance variance. The waist irradiance standard deviation and the spatial-frequency standard deviations immediately yield the $M^2$ parameter per Eq. 7.

Curvature Removal Method. The $M^2$ of a laser beam is completely independent on its overall curvature. Hence, performing an operation on the beam that affects its curvature will not affect the resultant value of $M^2$. Many previous methods for measuring $M^2$ depend on this fact, in that a weak focusing lens is introduced, and the second moment of the beam measured at differing Z locations. The weak lens is used to assure that all of the light arrives at the detector and to reposition the beam waist such that measurements are made near this waist. In general, this gives the best sensitivity to the measurement process.

Since a Shack-Hartmann wavefront sensor gives a complete measure of the irradiance and phase distribution of the light, the same operation can be performed without using a physical lens. Wavefront curvature may be added or subtracted from the digitally stored irradiance and phase distribution without affecting the $M^2$ of the beam. This operation can then be performed as part of the numerical process of determining $M^2$, without need to introduce a physical beam.

To compute $M^2$, information at the waist (denoted by the subscript 0 in equations 7–13) is needed. The waist is that plane that has infinite effective radius of curvature. With a wavefront sensor measurements may be made at another location, however. It is somewhat difficult to construct the location of the waist, and hence determine the second moment at the waist as required by equation 7. In the gradient method, this was the primary object: to use the gradient information (also produced by the wavefront sensor) to compute the location and size of the waist, so that $M^2$ can be determined. However, since wavefront curvature has no affect on the $M^2$ calculation, an artificial waist can be created by removing the average curvature from the beam. This can be done by fitting the wavefront to a polynomial with second order terms, such as in Eq. 5. These second order terms are related to the radius of curvature of the real beam $R(z_1)$. The wavefront corresponding to the fit can then be subtracted out of the data, and the $M^2$ value computed through application of Eqs. 7–13, where the measurement plane is also the waist plane.

This method, referred to as the curvature removal method, has several advantages. It is simple to implement, and requires a minimum of calculations to determine $M^2$. The calculation of $M^2$ does not rely on determination of the waist plane or the waist size, and is thus somewhat less sensitive to noise or other errors. However, often these are desirable parameters as well. Hence additional calculations are needed to calculate the waist distance and size.

The real beam spot size propagation equation states:

$$\sigma^2(z) = \sigma_0^2 \times \left[1 + \left(\frac{z - z_0}{z_R}\right)^2\right] \quad (14)$$

where, $$z_R = \frac{4\pi\sigma_0^2}{M^2\lambda}. \quad (15)$$

Furthermore, the real beam radius of curvature is given by $$R(z) = (z - z_0) + \frac{z_R^2}{(z - z_0)}. \quad (16)$$

$R(z_1)$ is known from the curvature removal step.

Since the irradiance and phase of the beam is known (at an arbitrary plane $z_1$), and the radius of curvature $R(z_1)$ was determined in order to remove curvature from the beam, all of the information is available that is needed for determining the waist size and location. Using Eq. 14 the real beam can be propagated (numerically) back to the waist. Thus the waist size is given by, $$\sigma_0^2 = \frac{\sigma^2 R^2(z_1)}{R^2(z_1) + \left(\frac{4\pi\sigma^2}{M^2\lambda}\right)^2} \quad (17)$$

and its location by, $$(z_1 - z_0)^2 = (\sigma^2 - \sigma_0^2)\frac{4\pi}{M^2\lambda} \quad (18)$$

This gives a complete description of the beam at both the waist and the measurement planes and a calculation of $M^2$.

One disadvantage of this method is that the calculation of waist size and location depend upon the $M^2$ calculation. As long as an accurate value of $M^2$ has been obtained, then these values are also accurate. However, it has been shown that $M^2$ is extremely sensitive to noise far from the laser beam center, and from truncation of the field at the edge of the detector. In this case the inaccurate $M^2$ values will also lead to inaccurate waist size and location values. In this respect the gradient method is better. The waist location is determined by the wavefront and wavefront gradients directly. Truncation or other errors will not have a strong effect of the waist size and location, although they will still affect $M^2$ because of the second order moment calculation (Eq. 8).

Fourier Propagation Method. Given a known irradiance and phase of the laser beam, the beam irradiance and phase distribution may be determined at another plane, Z, through the Fresnel integral:

$$\tilde{E}(x_1, y_1) = \frac{e^{jkz}}{j\lambda z} \int_{-\infty}^{\infty}\int_{-\infty}^{\infty} \tilde{E}(x,y) e^{\left[j\frac{k}{2z}((x-x_1)^2 + (y-y_1)^2)\right]} dx\,dy \quad (19)$$

This equation may be written as the Fourier transform of the E field modified by the appropriate phase factor, or $$\tilde{E}(x_1, y_1) = \quad (20)$$
$$\frac{e^{jkz}}{j\lambda z} e^{j\frac{k}{2z}(x_1^2+y_1^2)} \int_{-\infty}^{\infty}\int_{-\infty}^{\infty} \left\{\tilde{E}(x,y) e^{j\frac{k}{2z}(x^2+y^2)}\right\} e^{j\frac{2\pi}{\lambda z}(xx_1+yy_1)} dx\,dy$$

This expression may be discretized and the discrete Fourier Transform (or Fast Fourier Transform, FFT) used to calculate the results. It has been shown that the Fast Fourier Transform is an efficient algorithm which can be readily implemented on common computers. This efficient algorithm allows the E field to be calculated at a new Z location very quickly.

Since the field can be determined at a new Z location, it is also straightforward to calculate the field at a number of locations, $Z_j$. The irradiance distribution is calculated from the field as shown previously. The second order moment of the irradiance distribution can be calculated from the field at each of these locations ($\sigma_j$). These second order moments should obey Eqs. 14 and 15. This equation can be fit, using a least squares method, to the measured values of $\sigma_j$. Thus, the values of $M^2$, $W_0$ and $Z_0$ can be determined.

This method, referred to as the Fourier propagation method, has several advantages. It does not calculate any of the parameters with better accuracy than the others, as in the curvature removal method. All of the parameters are determined from the basic propagation of the light itself. It is also more independent of the irradiance distribution. Thus the defining equation are extremely simple and robust. However, it does rely on an accurate Fourier propagation. This can be difficult because for sampling, aliasing, and guard band issues. These problems are mitigated through care in the design of the propagation algorithm, and because the integrals are generally performed for the least stressing case of Eq. 19, that is for propagation over long distances or near the focus of a simulated lens. It may be advantageous to add a simulated lens to the calculation. In that case the first phase factor in Eq. 20 cancels out, and minimum aliasing occurs. It should also be noted that, since the wavefront gradients are also known, an appropriate grid may be selected algorithmically so that aliasing and other effects can be minimized.

The invention is further illustrated by the following non-limiting examples.

EXAMPLE 1

In order to determine the sensitivity of the invention, a number of different modeled beams were created. This allowed for a check on the technique of the invention with known conditions, without having to consider the effects of noise or experiment errors. To this end, the laser beam was modeled with either a Gaussian or $sech^2$ propagation profile, and the effect of various parameters was considered. The modeled beam was broken into the appropriate samples to model the lenslet array and detector, and the equations above were used to determine $M^2$. For calculations to obtain beam characteristics, the integrals in Eqs. 8, 9, and 11 are replaced with discrete sums over validly measured values. All Fourier transforms are performed using standard discrete Fourier transform methods, and the fast Fourier transform (FFT) algorithm when possible.

Figure 7:
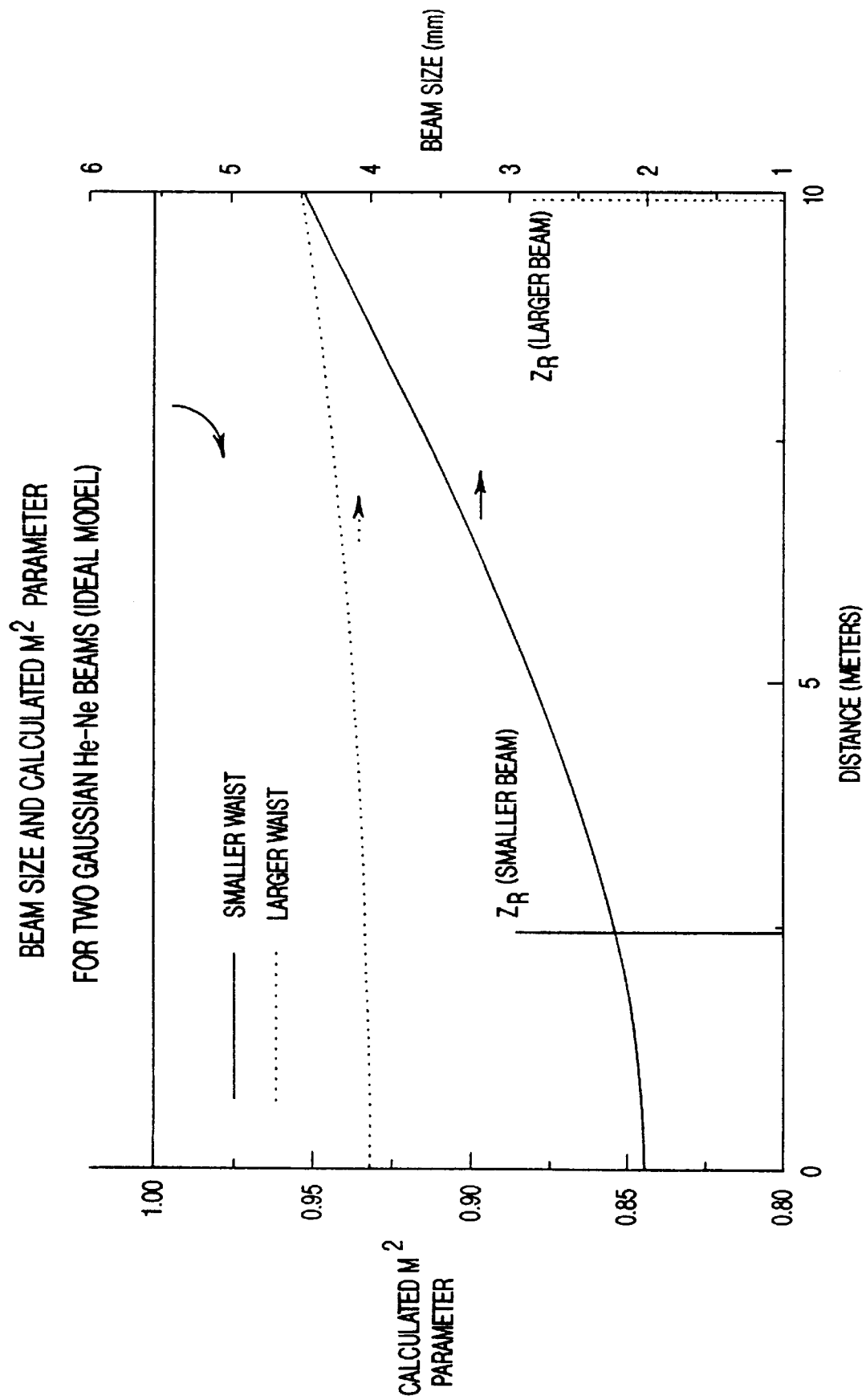
FIG. 7 is a graph of beam size and calculated $M^2$ parameter for two Gaussian He—Ne beams (ideal model)

Elliptical Gaussian beams were modeled, adjusted in piston by setting the phase equal to zero on the z-axis. FIG. 7 details the results of modeling two Gaussian beams of differing waist size. For these beams, the $M^2$ parameter is unity. The smaller beam was propagated over several Rayleigh ranges, and the larger over a full Rayleigh range. In each case the invention correctly calculated the $M^2$ parameter based solely on a sampling of the wavefront at a given (but unknown to the invention) distance from the waist. A similar computation was conducted with a Gaussian beam with a constant 1.3 milliradian tilt, or roughly one wave across the beam diameter. Again the invention correctly calculated a value of unity for the $M^2$ parameter throughout the range tested.

The model was also tested on non-Gaussian beam profiles. FIG. 8 depicts the results for a beam with a hyperbolic secant squared propagation profile, which has a theoretical $M^2$ of 1.058. The beam was modeled with a flat phase front at z=0, simulating a beam waist, and then propagated over the distance shown (roughly one Rayleigh range) using a commercial propagation program (LightPipes™).

As another check on the invention, beams with various levels and types of aberration were examined, as shown in FIG. 9 ($M_x^2$ values are shown). Four types of aberration were examined, based upon four Zernike polynomial aberration functions: astigmatism with axis at ±45° ($U_{20}$), astigmatism with axis at 0° or 90° ($U_{22}$); triangular astigmatism with base on x-axis ($U_{30}$); and triangular astigmatism with base on y-axis ($U_{33}$). The invention correctly calculated an $M^2$ value near unity for $U_{22}$ astigmatism, as well as showing increasing values of $M^2$ for increased $U_{20}$, $U_{30}$, and $U_{33}$ astigmatism.

Of concern in the use of the invention is the granularity of the reconstructed wavefront and the effect this would have on the computation of $M^2$. This was tested by examining the results of the invention when sampling a modeled Gaussian beam at the waist. The invention correctly calculated the $M^2$ parameter once information was available from several lenslets. Accuracy remained within a few percent until the beam size ($2\sigma$) reached about 45% of the total aperture. (See FIG. 10.) At this point, in a zero noise environment, detectable energy from the beam just reaches to the edge of the aperture. Thus all beam energy outside the aperture is below the sensitivity threshold of the detector. However, once energy which would otherwise be detectable fell outside of the detector aperture, the value of the $M^2$ parameter determined by the invention drops. We also found, as shown in FIG. 11, that there was no need to go to an extreme number of lenslets in order to obtain good results in a low-noise environment. It is important to note that this set of results are for a Gaussian beam at the waist, and as a result there were no beam aberrations. It is believed that the invention will correctly calculate $M^2$ as long as the spatial structure of the aberration is larger than twice the lenslet spacing.

EXAMPLE 2

Once a wavefront sensor according to the invention was assembled and calibrated according to the invention, a series of laser beams were measured to experimentally determine $M^2$ to test the methods of the invention. The reference beam was an expanded, collimated Helium—Neon (HeNe) laser. The laser source was a variety of different Helium—Neon lasers operated in different conditions. This way, a number of different lasers with different beam sizes and aberration content could be tested. Three basic laser sources were used in this example. The first was a low quality HeNe that is used as an alignment and test laser at WaveFront Sciences, Inc. This laser was attenuated with several neutral density filters in order to reduce the peak irradiance to a level that did not saturate the sensor. It was tested with a wavefront sensor constructed from a Cohu 6612 modified camera and a 2.047-mm focal length, 0.072-mm diameter lenslet array. This combination was aligned and calibrated using the principles of the invention. The resulting measurements are presented in FIG. 18 as a table of measured values. For this case the $M^2$ values were 1.375 and 1.533 for x and y respectively. This matches well with the observations of the way this beam propagated. There was considerable non-Gaussian shape to the irradiance distribution and 0.038 m of phase aberration. The waist size, waist position, and real beam spot size are also shown. Since the laser was set up approximately 0.5 m from the wavefront sensor, the measured waist position of 0.44 (x) and 0.48 (y) are in good agreement. The waist size of 0.242 is in good agreement with the published specifications for this laser.

The same laser was used with a 1 mr tilt introduced between the laser and the wavefront sensor. In this case, very similar values for $M^2$, $Z_0$, W and $W_0$ were obtained. This is a good indication that tilt has little effect on the overall measurement. This is important because it means that even poorly aligned beams may be measured.

In order to measure good beams, a series of experiments was conducted at the National Institute of Standards, using lasers with known good beam quality. A series of data sets were acquired at varying distances from the laser. A wavefront sensor with an 8.192-mm focal length, 0.144-mm diameter lenslet array was used for these measurements. Extreme care was taken not to aberrate the beam in the process of the measurement by using low reflectivity, but high quality mirrors as attenuators. The laser in this case had quite a small waist size, and hence the beam expanded quite rapidly. In FIG. 18 the NIST-HeNe1 and 5 data sets were measured 1650mm from the laser output mirror and the NIST HeNe 7 data set was measured at 2400 mm from the HeNe laser output mirror. In this case all of the measurements had $M^2$ in the 1.1–1.3 regime, except for the farthest from the laser (2.4 m). In this case the beam had overfilled the detector, so that it was slightly clipped in the vertical direction. This lead to higher $M^2$ values (1.4) for this case.

The final example was for a larger beam that was directed through and acousto-optic modulator. The same 8.192-mm, 0.144-mm wavefront sensor was used in this case. The $M^2$ values were measured by the wavefront sensor to determine the quality of the beam after passing through this optic. A comparison of the beam both with and without the modulator allowed a determination of the effect of the modulator on the beam quality. FIG. 17 shows the irradiance and phase distributions for this case. In FIG. 18, the tabulated values for $M^2$ for this case are 1.21 and 1.29 (x and y respectively). This is in good agreement with propagation performance of this beam. While the wavefront was relatively flat for this case (0.012 m RMS WFE), the larger beam size and non-Gaussian beam shape lead to larger $M^2$ values.

In all of these examples the measured $M^2$ values, as well as the calculations of waist position and waist size were in good agreement with expected values.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A wavefront dissector mount comprising means for rigidly mounting a wavefront dissector relative to an imager at a fixed distance without a relay imaging lens, an intensifier, or any other optical element between said wavefront dissector and said imager.

2. The mount of claim 1 additionally comprising means for sealing a region between the wavefront dissector and the imager.

3. The mount of claim 2 wherein said sealing means comprises means selected from the group consisting of o-rings, epoxies, and glues.

4. The mount of claim 1 wherein said means comprises a mechanical mount connected directly to the imager.

5. The mount of claim 1 wherein said means comprises threads.

6. The mount of claim 5 additionally comprising a locking mechanism.

7. The mount of claim 1 wherein said means comprises shims.

8. The mount of claim 1 wherein said means comprises an integration of the wavefront dissector directly onto imager optics.

9. The mount of claim 1 wherein said wavefront dissector comprises a lenslet array.

10. The mount of claim 1 wherein said mount additionally operates as a heat sink between said wavefront dissector and said imager, thereby reducing distortions induced by temperature variations.

11. The mount of claim 1 wherein said mount operates to minimize distortion in imaging applications selected from the group consisting of metrology of surfaces, metrology of transmissive media, measurement of turbulence, measurement of inhomogenous media, static or dynamic measurement of surface or object deformation, electronic shuttering applications, pulsed light source applications, and high vibration applications.

12. A method of mounting a wavefront dissector, the method comprising rigidly mounting a wavefront dissector relative to an imager at a fixed distance without a relay imaging lens, an intensifier, or any other optical element between the wavefront dissector and the imager.

13. The method of claim 12 comprising sealing a region between the wavefront dissector and the imager.

14. The method of claim 13 wherein the sealing step comprises providing means selected from the group consisting of o-rings, epoxies, and glues.

15. The method of claim 12 wherein mounting comprises providing a mechanical mount connected directly to the imager.

16. The method of claim 12 wherein mounting comprises employing threads.

17. The method of claim 16 wherein mounting additionally comprises employing a locking mechanism.

18. The method of claim 12 wherein mounting comprises employing shims.

19. The method of claim 12 wherein mounting comprises integrating the wavefront dissector directly onto imager optics.

20. The method of claim 12 wherein mounting comprises mounting a lenslet array.

21. The method of claim 17 wherein the method operates to minimize distortion in imaging applications selected from the group consisting of metrology of surfaces, metrology of transmissive media, measurement of turbulence, measurement of inhomogenous media, static or dynamic measurement of surface or object deformation, electronic shuttering applications, pulsed light source applications, and high vibration applications.

22. A wavefront sensor comprising a wavefront dissector, an imager, and means for rigidly mounting the wavefront dissector relative to the imager at a fixed distance without a relay imaging lens, an intensifier, or any other optical element between said wavefront dissector and said imager.

23. The wavefront sensor of claim 22 additionally comprising means for sealing a region between the wavefront dissector and the imager.

* * * * *